(12) United States Patent
Faller

(10) Patent No.: US 9,567,856 B2
(45) Date of Patent: Feb. 14, 2017

(54) APPARATUS FOR EXTRACTING ENERGY FROM A FLUID FLOW

(75) Inventor: Frank Faller, Calgary (CA)

(73) Assignee: Southern Alberta Institute of Technology, Calgary, Alberta (CA)

( * ) Notice: Subject to any disclaimer, the term of this patent is extended or adjusted under 35 U.S.C. 154(b) by 847 days.

(21) Appl. No.: 13/806,036

(22) PCT Filed: Jun. 30, 2011

(86) PCT No.: PCT/CA2011/000779
§ 371 (c)(1),
(2), (4) Date: Mar. 27, 2013

(87) PCT Pub. No.: WO2012/000105
PCT Pub. Date: Jan. 5, 2012

(65) Prior Publication Data
US 2013/0216356 A1    Aug. 22, 2013

Related U.S. Application Data

(60) Provisional application No. 61/360,389, filed on Jun. 30, 2010.

(51) Int. Cl.
*F03D 1/04* (2006.01)
*F01D 1/02* (2006.01)
(Continued)

(52) U.S. Cl.
CPC .............. *F01D 1/02* (2013.01); *F03B 13/264* (2013.01); *F03D 1/02* (2013.01); *F03D 1/04* (2013.01);
(Continued)

(58) Field of Classification Search
CPC .................. F04F 5/00; F04F 5/02; F04F 5/04; F04F 5/10; F04F 5/14; F04F 5/16; F04F 5/24; F03D 5/00; F03D 3/04; F03D 1/04; F05B 2240/131; F05B 2240/133; Y10S 415/905; Y10S 415/907; Y10S 415/908; Y10S 415/909

See application file for complete search history.

(56) References Cited

U.S. PATENT DOCUMENTS

| | | | |
|---|---|---|---|
| 264,164 A * | 9/1882 | Jackson | F03D 1/04 |
| | | | 290/55 |
| 3,704,008 A * | 11/1972 | Ziegler | B01F 3/0446 |
| | | | 210/170.06 |

(Continued)

FOREIGN PATENT DOCUMENTS

WO    WO 2008015047 A1 *    2/2008    ............. F03B 13/10

*Primary Examiner* — Thomas Denion
*Assistant Examiner* — Xiaoting Hu
(74) *Attorney, Agent, or Firm* — Gowling WLG (Canada) LLP

(57) ABSTRACT

An apparatus for extracting energy from a fluid flow including a secondary fluid channel, a fluid driveable generator unit and a primary fluid channel. The primary fluid channel comprises a fluid intake in fluid communication with a throat. The throat is configured to increase the flow velocity and reduce the pressure of the primary fluid flowing through the primary fluid channel and includes at least one plenum in the interior of the throat configured to further reduce the pressure of the primary fluid flowing through the primary fluid channel. The plenum includes at least one perforation through its exterior surface in fluid communication with the secondary fluid channel. As such, the flow of primary fluid through the primary fluid channel draws the secondary fluid into the primary fluid channel through the secondary fluid channel and the perforation and thereby into driving engagement with the generator.

19 Claims, 16 Drawing Sheets

(51) Int. Cl.

| | | |
|---|---|---|
| *F03D 3/04* | (2006.01) | |
| *F03B 13/26* | (2006.01) | |
| *F03D 1/02* | (2006.01) | |
| *F03D 9/00* | (2016.01) | |
| *F04F 5/04* | (2006.01) | |
| *F04F 5/10* | (2006.01) | |
| *F04F 5/16* | (2006.01) | |

(52) U.S. Cl.
CPC ............... *F03D 3/04* (2013.01); *F03D 9/008* (2013.01); *F03D 13/25* (2016.05); *F04F 5/04* (2013.01); *F04F 5/10* (2013.01); *F04F 5/16* (2013.01); *F05B 2210/18* (2013.01); *F05B 2240/131* (2013.01); *F05B 2240/133* (2013.01); *F05B 2240/93* (2013.01); *F05B 2240/931* (2013.01); *F05B 2250/313* (2013.01); *F05B 2260/601* (2013.01); *Y02E 10/28* (2013.01); *Y02E 10/38* (2013.01); *Y02E 10/727* (2013.01)

(56) References Cited

U.S. PATENT DOCUMENTS

| | | | | |
|---|---|---|---|---|
| 4,079,264 A | * | 3/1978 | Cohen | F03D 1/04 290/44 |
| 4,963,761 A | * | 10/1990 | Wight | F03D 1/04 290/55 |
| 5,709,419 A | * | 1/1998 | Roskey | F03D 1/04 290/55 |
| 6,239,506 B1 | * | 5/2001 | Roskey | F03D 1/0608 290/44 |
| 6,568,181 B1 | * | 5/2003 | Hassard | F03B 13/26 290/54 |
| 7,150,149 B2 | * | 12/2006 | Rochester | F03B 17/00 60/398 |
| 7,771,158 B2 | * | 8/2010 | Grassi | F03D 3/04 290/44 |
| RE43,653 E | * | 9/2012 | Lin | F24F 7/02 454/116 |
| 8,446,031 B2 | * | 5/2013 | Roberts | F03B 13/10 290/53 |
| 2003/0026684 A1 | * | 2/2003 | Bohn | F03D 1/04 415/1 |
| 2005/0017514 A1 | * | 1/2005 | Tocher | F03D 1/04 290/55 |
| 2005/0019151 A1 | * | 1/2005 | Bezemer | F03D 3/04 415/4.4 |
| 2005/0099011 A1 | * | 5/2005 | Rochester | F03B 17/00 290/43 |
| 2005/0150225 A1 | * | 7/2005 | Gwiazda | F03D 1/04 60/641.1 |
| 2008/0181771 A1 | * | 7/2008 | Papp | F03G 6/045 415/208.1 |
| 2010/0156108 A1 | * | 6/2010 | Gray | F03D 1/04 290/55 |
| 2013/0099502 A1 | * | 4/2013 | Roberts | F03B 13/08 290/54 |

\* cited by examiner

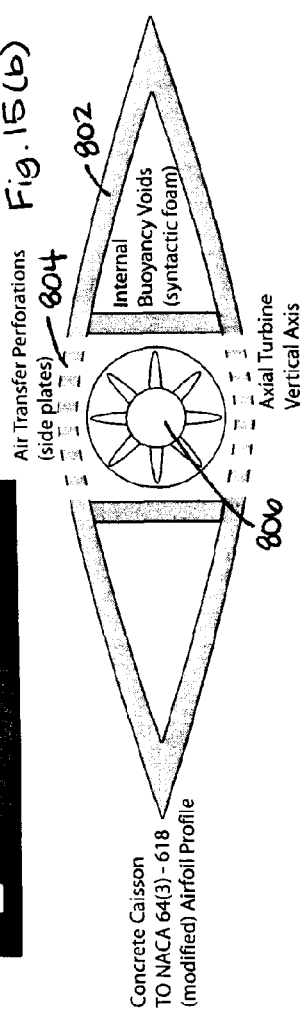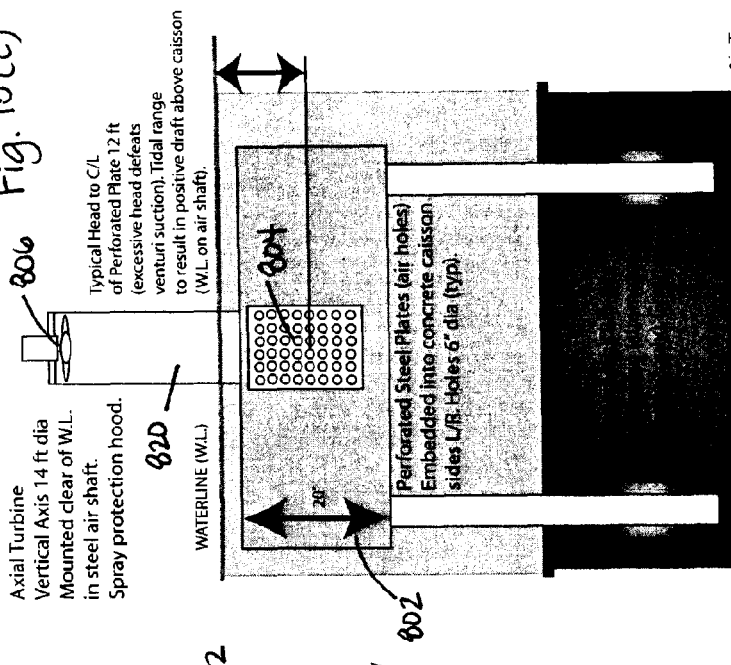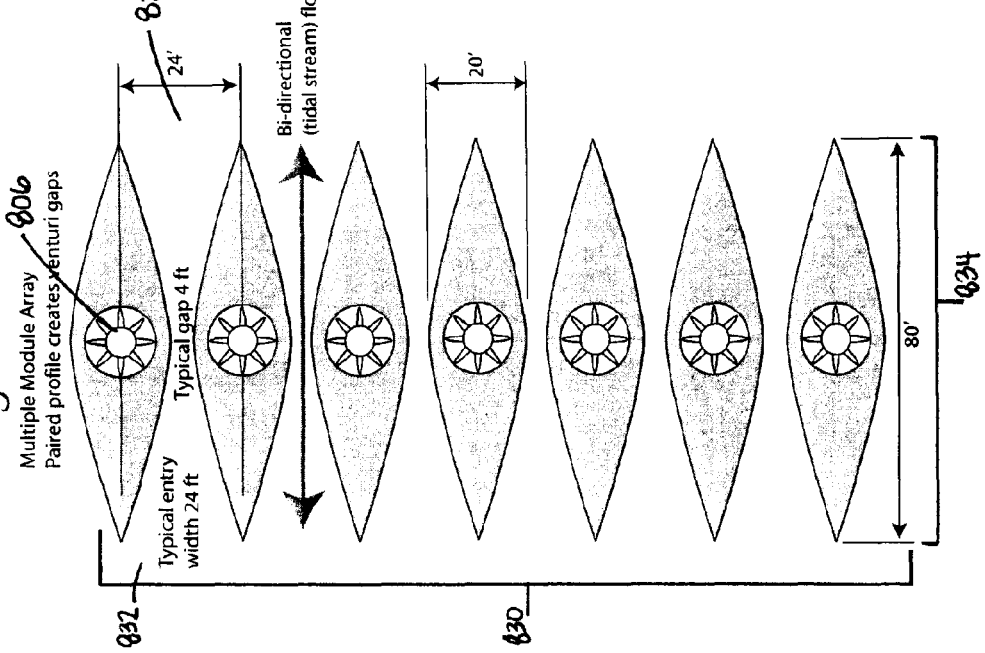

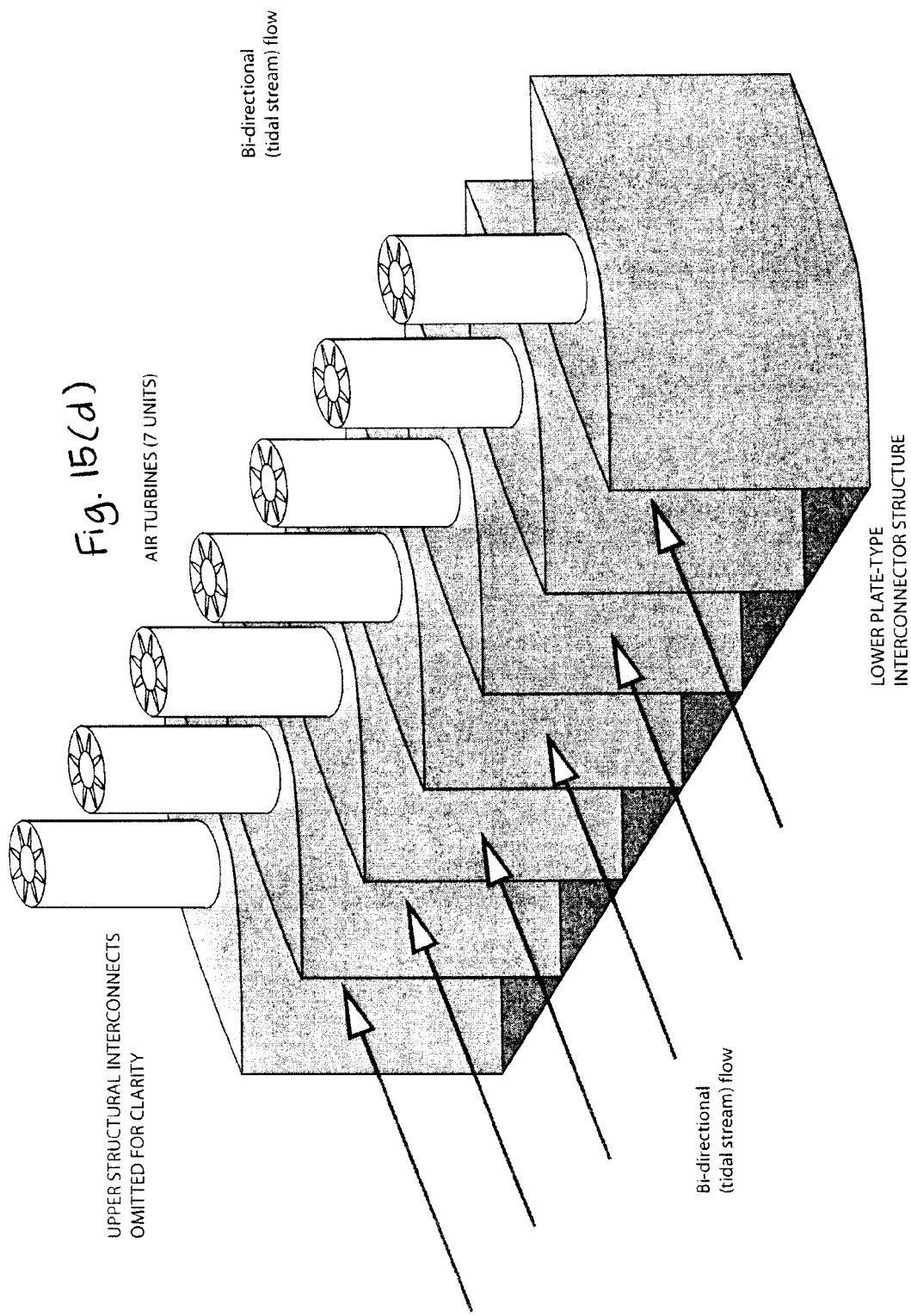

APPARATUS FOR EXTRACTING ENERGY FROM A FLUID FLOW

CROSS-REFERENCE TO RELATED APPLICATIONS

The present application is a national phase application under 35 U.S.C. § of International Patent Application No. PCT/CA2011/000779, filed Jun. 30, 2011, which claims priority to U.S. Provisional Patent Application No. 61/360,389, filed Jun. 30, 2010. The entire contents of these applications are incorporated by reference.

FIELD

The present disclosure relates to an apparatus for extracting energy from a fluid flow.

BACKGROUND

Significant efforts have been made in the past few decades to identify and harness renewable energy sources. One area of particular interest has been the extraction of energy from fluid flows such as air and water. Prior art technologies have struggled with minimizing size, cost, and complexity, while maximizing power generation and ease of maintenance.

SUMMARY

The disclosure provides, in part, an apparatus and method for extracting energy from a fluid flow.

In one of its aspects, the disclosure provides an apparatus for extracting energy from a fluid flow, comprising:
 (a) a secondary fluid channel configured to intake a secondary fluid;
 (b) a fluid driveable generator unit in fluid communication with the secondary fluid channel; and
 (c) a primary fluid channel comprising:
  (i) a fluid intake configured to intake a primary fluid; and
  (ii) a throat in fluid communication with the fluid intake, the throat configured to increase the flow velocity and reduce the pressure of the primary fluid flowing through the primary fluid channel, the throat comprising at least one plenum in the interior of the throat configured to further reduce the pressure of the primary fluid flowing through the primary fluid channel, the plenum comprising at least one perforation through its exterior surface in fluid communication with the secondary fluid channel;
 wherein the flow of primary fluid through the primary fluid channel draws the secondary fluid into the primary fluid channel through the secondary fluid channel and the perforation and thereby into driving engagement with the generator.

The at least one plenum may comprise a closed tubular shape. The apparatus may comprise an inner plenum and at least one outer plenum, the inner plenum having a closed tubular shape, and the outer plenum having a closed wing shape concentric with the inner plenum. The outer plenum may comprise a plurality of concentrically nested outer plenums spaced radially apart from one another and concentric with the inner plenum.

The at least one plenum may also comprise a closed wing shape. The apparatus may comprise a plurality of concentrically nested plenums having a closed wing shape.

The at least one plenum may also comprise a planar wing shape. The apparatus may comprise a plurality of plenums having a planar wing shape. The plenums may be spaced laterally apart from one another and staggered longitudinally from immediately neighboring plenums.

The cross-section of at least one plenum may comprise an airfoil shape with symmetrical cambers. The cross-section of at least one plenum may comprise an NACA airfoil shape with symmetrical cambers.

The total cross-sectional area of the perforations may be between 50% to 100% of the internal cross-sectional area of the secondary fluid channel.

A higher number of perforations may be located on exterior surface regions of at least one plenum where the primary fluid exhibits a lower operational pressure as compared to the number of perforations located on exterior surface regions of the plenum where the primary fluid exhibits a higher operational pressure. The perforations may be located on the exterior surface of at least one plenum between 25% to 55% of chord measured from the leading edge of the plenum.

The at least one perforation may comprise a slot shape.

The primary fluid channel may further comprise a fluid exhaust configured to exhaust the primary fluid and secondary fluid from the primary fluid channel.

The primary fluid channel may further comprise an augmentor channel configured to create a low pressure region at the exit of the primary fluid channel.

The apparatus may further comprise a base comprising a fluid intake configured to intake the secondary fluid and in fluid communication with the secondary fluid channel.

The primary fluid may be a gas and the secondary fluid may be a gas. The primary fluid may be a liquid and the secondary fluid may be a gas. The primary fluid may be a liquid and the secondary fluid may be a liquid.

In another one of its aspects, the disclosure provides an apparatus for extracting energy from a fluid flow, comprising:
 (a) a gas-based apparatus in accordance with any one of the foregoing, wherein the primary fluid flow is a gas and the secondary fluid flow is a gas;
 (b) a liquid-based apparatus in accordance with any of the foregoing, wherein the primary fluid flow is a liquid and the secondary fluid flow is a gas; and
 (c) a common base comprising a first fluid intake and a second fluid intake, the first fluid intake configured to intake the secondary fluid for the gas-based apparatus, the first fluid intake in fluid communication with the secondary fluid channel of the gas-based apparatus, the second fluid intake configured to intake the secondary fluid for the liquid-based apparatus, the second fluid intake in fluid communication with the secondary fluid channel of the liquid-based apparatus.

BRIEF DESCRIPTION OF THE DRAWINGS

FIG. 9b is a front elevation view of the apparatus shown in FIG. 9a.

FIG. 11b is a front elevation view of the apparatus shown in FIG. 11a.

FIG. 11c is a front elevation cross-sectional view of the throat section of the apparatus shown in FIG. 11a.

FIG. 11d is a top cross-sectional plan view of the apparatus shown in FIG. 11a.

FIG. 15a is a top plan view of an apparatus for extraction of energy from fluid flow according to an seventh embodiment.

FIG. 15b is a top cross-sectional view of the apparatus shown in FIG. 15a.

FIG. 15c is a side cross-sectional view of the apparatus shown in FIG. 15a

FIG. 15d is a side perspective view of the apparatus shown in FIG. 15a.

DETAILED DESCRIPTION

The embodiments described herein relate to an apparatus for extracting energy from a fluid flow. In particular, the embodiments relate to an apparatus that utilizes a primary fluid flow to create a low pressure region that draws into itself a secondary fluid flow which by virtue of its passage in a separate channel, drives a fluid driveable generator unit.

It should be apparent to those skilled in the art that the use of directional terms such as top, bottom, left, right, above, below, upper, lower, etc. are used to describe the relative position of components of the embodiments as they are depicted in the figures. These terms are used for illustrative purposes only and are not intended to limit the scope of the claims.

First Embodiment

Figure 1:
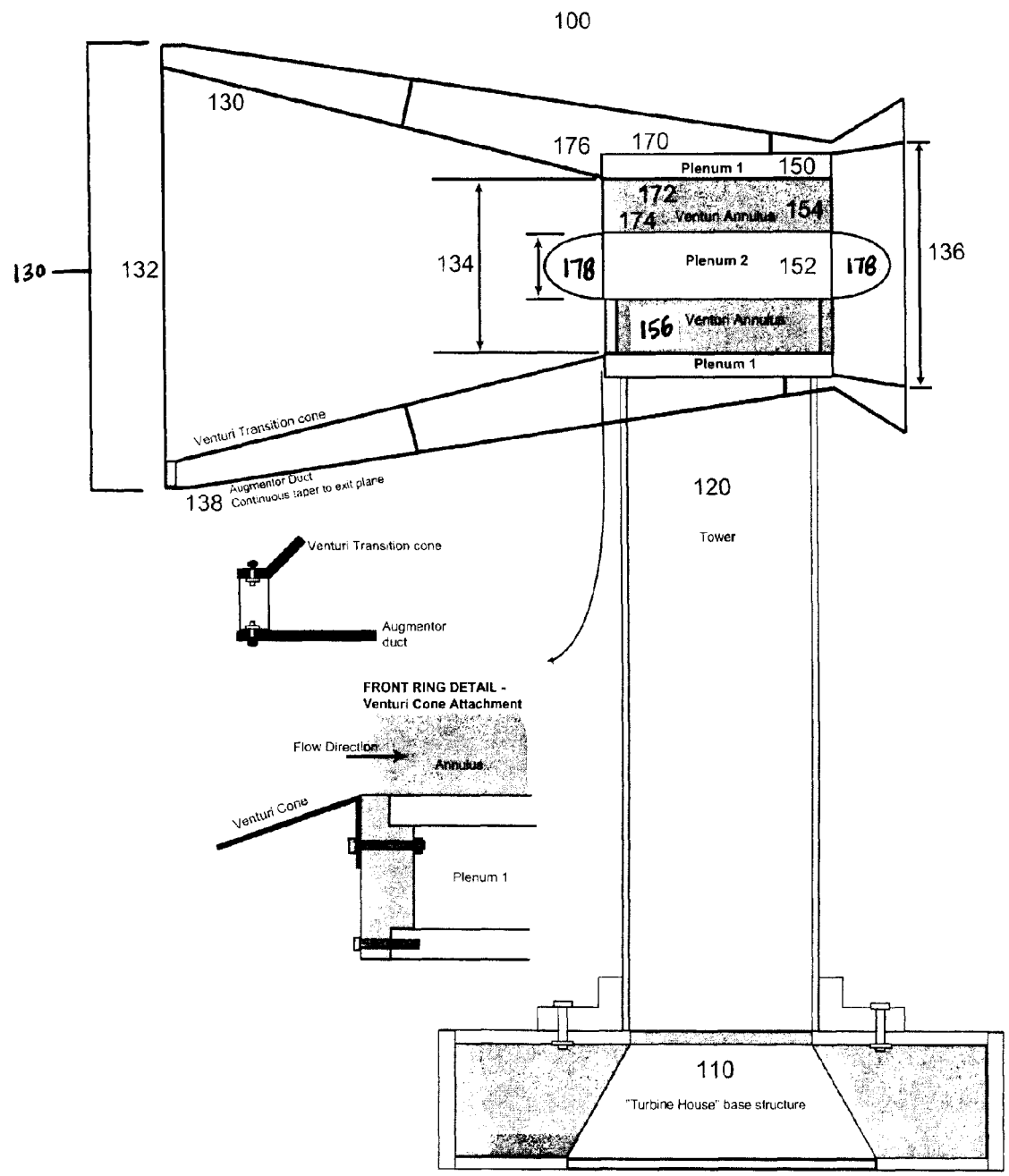
FIG. 1 is a side elevation cross-sectional view of an apparatus for extraction of energy from a fluid flow according to one embodiment, based on a "nested duct" arrangement within the core.
Figure 2:
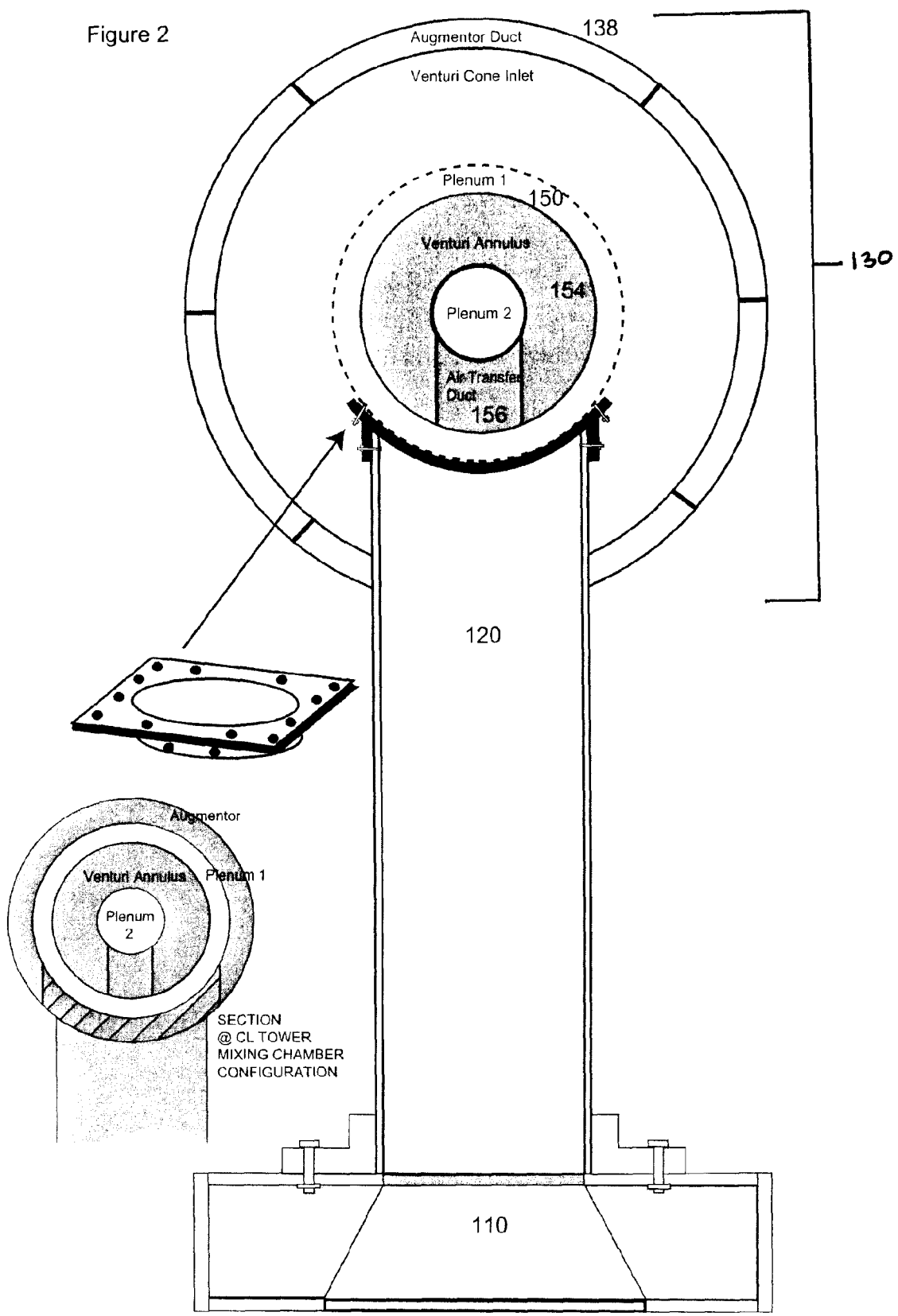
FIG. 2 is a front elevation view of the apparatus shown in FIG. 1 and a front sectional view of the throat of the primary fluid channel of the apparatus.
Figure 3:
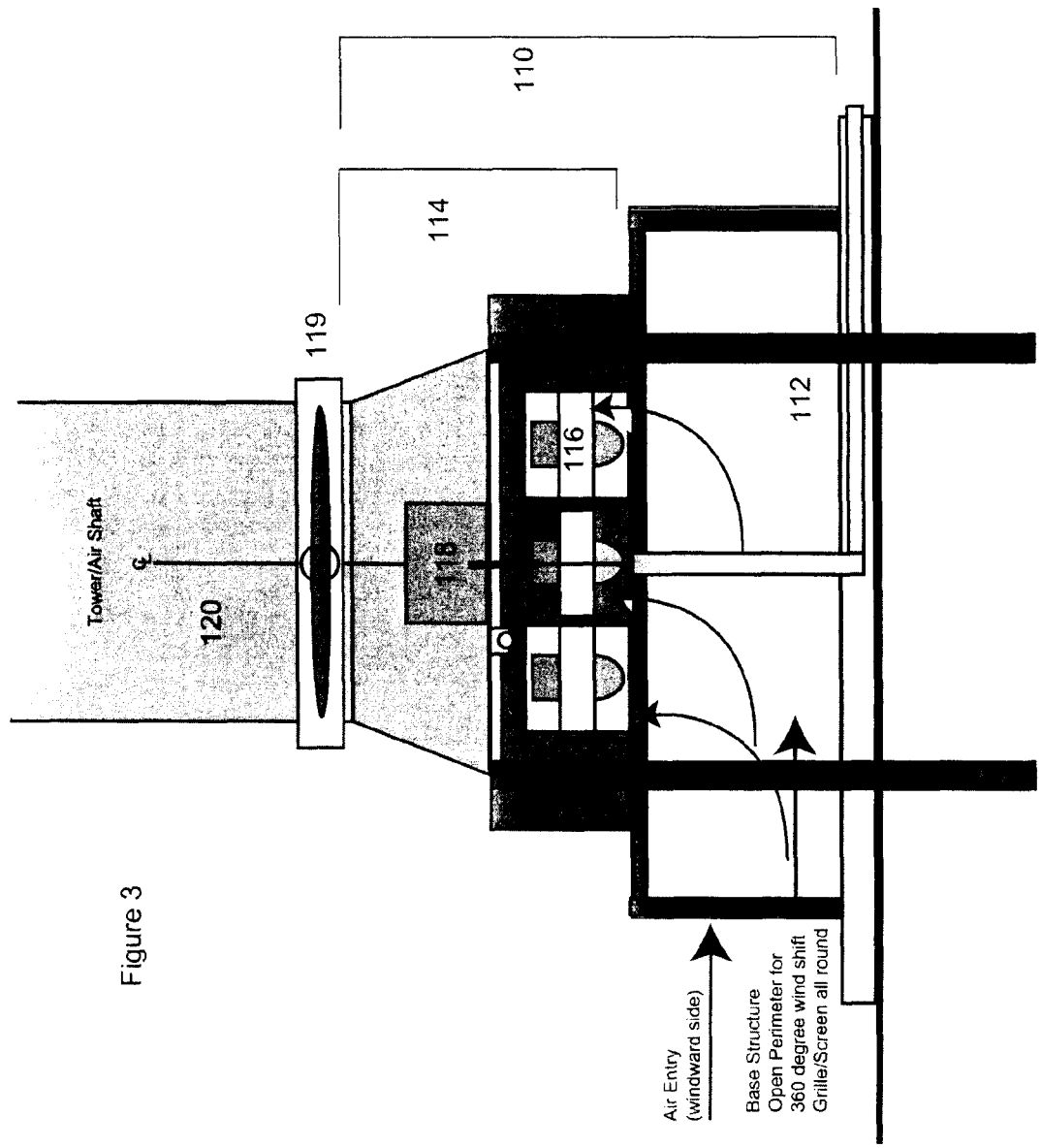
FIG. 3 is a side elevation cross-sectional view of the base of the apparatus shown in FIG. 1.

Referring to FIGS. 1, 2 and 3, an apparatus for extraction of energy from a fluid flow is generally shown as item 100. The apparatus 100 utilizes a primary gaseous fluid flow, such as, for example, air, to create a low pressure region that induces or draws inward a secondary gaseous fluid flow, such as, for example, air, and in so doing, the second fluid flow drives a fluid driveable generator unit 114. The apparatus 100 generally comprises a base 110, a secondary fluid channel 120, and a primary fluid channel 130.

The base 110 functions to intake a secondary gaseous fluid flow and house mechanical and electrical power generation equipment. In the present embodiment, the base 110 is mounted to the ground and supports the secondary fluid channel 120 and primary fluid channel 130. In the alternative, the base 110 may be mounted to other stationary surfaces, such as, for example, a building rooftop, or mobile surfaces. In the further alternative, the secondary fluid channel 120 and primary fluid channel 130 may be supported by other structures, depending on the application. The base 110 is a generally open, unobstructed hollow structure that is fixed to and in fluid communication with the secondary fluid channel 120. In the alternative, the base 110 may act as a turntable structure and be rotatably coupled to the secondary fluid channel 120 by a bearing system as further described below. The base 110 generally comprises a fluid intake 112, a fluid driveable generator unit 114, and a fluid flow regulator valve system 119.

The fluid intake 112 comprises a continuous opening or 360 degree azimuth apertures configured to capture the secondary fluid. Apertures may be located at any side of the base 110, however, apertures located on the side of the base 110 facing away from the windward direction (lee side) of the primary fluid flow may create undesirable negative pressures as the primary fluid flow travels by such apertures. Accordingly, the fluid intake 112 is configured by means of a selective shutter door arrangement to expose those apertures solely located on the side of the base 110 facing the windward direction of the primary fluid flow and hence draw in secondary fluid at a slightly elevated pressure than from the leeward side.

The fluid driveable generator unit 114 is mounted in a vertical sense inside of the base 110 and comprises a single turbine 116 and a generator 118 coupled in driving engagement by a drive shaft 117. In the alternative, the turbine 116 may be mounted clear of the base 110 and inside of the secondary fluid channel 120. In the further alternative, multiple fluid driveable generator units 114 may be mounted in the base 110. Vertical mounting of the turbine 116 uncouples the flow path direction through the turbine 116 from the horizontal flow path direction through the fluid intake 112. The turbine 116 may be any turbine known in the art that is capable of being driven by the secondary fluid flow, such as, for example, off-the-shelf axial flow fans re-configured for air turbine service, operating at equivalent rotational speeds, torque ratings, and flow/pressure characteristics, including but not limited to high performance, high flow/low pressure differential lightweight axial machines used for cooling towers, wind tunnels and large-scale ventilation applications. The generator 118 may be any generator known in the art that is capable of being driven by the turbine 116, such as, for example, permanent magnet alternators or synchronous generators. In the alternative, the generator 118 may be replaced by a hydraulic pump for applications such as, for example, off-peak pumped storage.

The fluid flow regulator 119 functions to regulate the amount of the secondary fluid flow permitted to enter the secondary fluid channel 120, allowing control over power output in a variety of weather/primary fluid flow conditions. The fluid flow regulator 119 may be any device capable of regulating the flow of the secondary fluid flow, such as, for example, a butterfly valve, sliding gate valve, or suitable form of iris diaphragm closure device. In the alternative, the fluid flow regulator 119 may be mounted within the fluid intake 112, such as, for example, in the form of adjustable louvers incorporated into the windward-selective shutter system as it tracks the incoming primary fluid direction. A related function of the fluid flow regulator 119 is system overload protection in cases of extreme weather or transient primary fluid flows which may trigger overspeed of the turbine 116.

The secondary fluid channel 120 functions to fluidly couple the base 110 to the primary fluid channel 130. In the present embodiment, the secondary fluid channel 120 also supports the channel 130. The secondary fluid channel 120 generally comprises an elongated hollow tube of sufficient internal diameter to permit passage of secondary fluid flow to channel 130 with minimum friction losses. The secondary fluid channel 120 is mounted to and in fluid communication with the base 110. In addition, the secondary fluid channel 120 is in fluid communication with and rotatably coupled to the channel 130 by way of a rotational turntable mounted at the base 110 level, such as, for example, employing a pair of offset radial bearings and a single large thrust bearing. The rotation of the channel 130 and the attached secondary fluid channel 120 is controlled by an electric motor in driving engagement with the turntable, such as, for example, an azimuth drive motor and gear system, or a pneumatic/hydraulic motor/gear system if such a facility exists at the base 110. In the alternative, the channel 130 may itself incorporate a yaw bearing and drive system like a conventional wind turbine.

The channel 130 functions to utilize a primary fluid flow to create a low pressure region that draws the secondary fluid flow through the base 110 and secondary fluid channel 120 to the channel 130. The channel 130 creates a reduction in cross-sectional area or constriction of the flow path of the primary fluid through the channel 130 thereby increasing the velocity and reducing the pressure of the primary fluid flowing through the constriction in accordance with Bernoulli's Principle. The secondary fluid flow is placed in fluid communication with the primary fluid flow within the constriction. The secondary fluid flow is at a higher pressure than the primary fluid flowing through the constriction, resulting in the secondary fluid being drawn to the constriction and mixing with the primary fluid.

The channel 130 generally comprises a fluid intake 132, a narrowed throat 134, a fluid exhaust 136, and an augmentor duct 138. In general, the fluid intake 132 captures the primary fluid flow and directs it to the throat 134; the throat 134 is in fluid communication with the secondary fluid channel 120 and is configured to constrict the primary fluid flow traveling through the throat 134 thereby creating a low pressure region which draws the secondary fluid flow from the secondary fluid channel 120. Once mixing of the primary and secondary fluid streams takes place, the combined fluids in the throat 134 are then exhausted out of the fluid exhaust 136, while the augmentor duct 138 assists this passage of fluids back to the atmosphere as further described below. In the alternative, the augmentor duct 138 may be excluded from the apparatus 100.

The fluid intake 132 functions to intake the primary fluid flow and direct it to the throat 134 to cause a low pressure zone where mixing will take place between primary and secondary fluid streams at interface surfaces as further described below. The fluid intake 132 is in fluid communication with the throat 134 and generally comprises a hollow open-ended truncated cone with its apex cut off by a plane parallel to its base wherein the truncated end of the cone is coupled to the throat 134. Alternatively, the fluid intake 132 may comprise other shapes and structures that result in an increase in the velocity of the primary fluid flow from fluid intake 132 to the throat 134 by virtue of respective decrease in cross-sectional flow areas. The resulting velocity ratio of the primary fluid between the fluid intake 132 and throat 134 determines the initial degree of pressure reduction achieved at entry to the throat 134 which is combined with other area-reducing features within the throat 134 as further described below.

The throat 134 functions to provide an initial level of low pressure environment to draw the secondary fluid flow through the base 110 and secondary fluid channel 120 to the throat 134. The throat 134 is directly coupled to and in fluid communication with the fluid intake 132 and is also indirectly in fluid communication with the interior of the secondary fluid channel 120 as further described below. The throat 134 generally comprises a cylindrical duct fluid channel surrounded by an outer plenum 150 and accommodates within itself an inner plenum 152, each comprised of generally hollow bodies. The outer plenum 150 is bounded by an outer cylinder 170 and an inner cylinder 172 separated and capped by two connector rings 176 as further described below. The inner plenum 152 comprises a closed tubular body 174 capped by plugs 178 as further described below. The inner plenum 152 is spaced from the outer plenum 150 by a streamlined fluid transfer duct 156 defining a Venturi annulus channel 154 therebetween. The channel 154 permits the passage of the primary fluid from the fluid intake 132 through the throat 134 and to the fluid exhaust 136. Channel 154 is the mixing zone of primary and secondary fluid streams, the mixing occurring due to the movement of secondary to primary flows through perforations 146 in the cylindrical boundaries between outer and inner plenums 150, 152. The exterior surface of the outer plenum 150 is penetrated by the top of the secondary fluid channel 120. In addition, the exterior surface of the inner plenum duct 152 and the inner surface of the outer plenum duct 150 are penetrated by the fluid transfer duct 156, thereby placing the inner plenum 152 and the outer plenum 150 in fluid communication with the secondary fluid channel 120. The inner plenum 152 and the outer plenum 150 have a pattern of perforations 146 through their surfaces which permit secondary fluid to flow from the base 110, through the secondary fluid channel 120, and through the plenums 150 and 152 to be drawn into the channel 154. The throat 134 as described provides the initial pressure reduction by virtue of an area reduction. The inner plenum 152 reduces the throat area further due to its bluff nose-cone 178 and consequent volumetric occupation of the throat 134, resulting in further local velocity increase and corresponding further pressure reduction, and hence enhanced overall suction effect on the secondary fluid from the secondary fluid channel 120.

Figure 4:
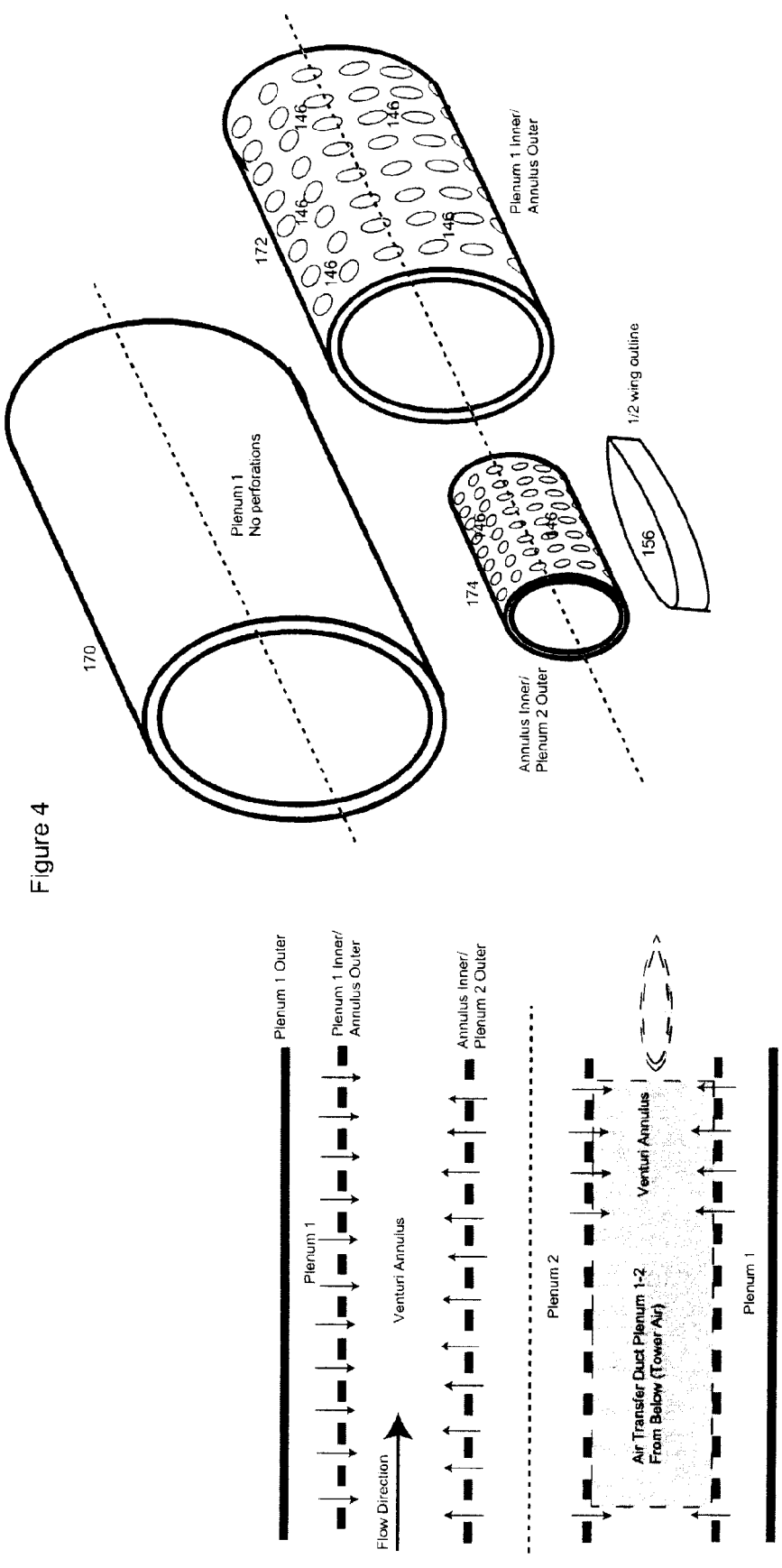
FIG. 4 is an exploded perspective view of the throat of the primary fluid channel of the apparatus shown in FIG. 1 and a side elevation cross-sectional view of the throat.
Figure 5:
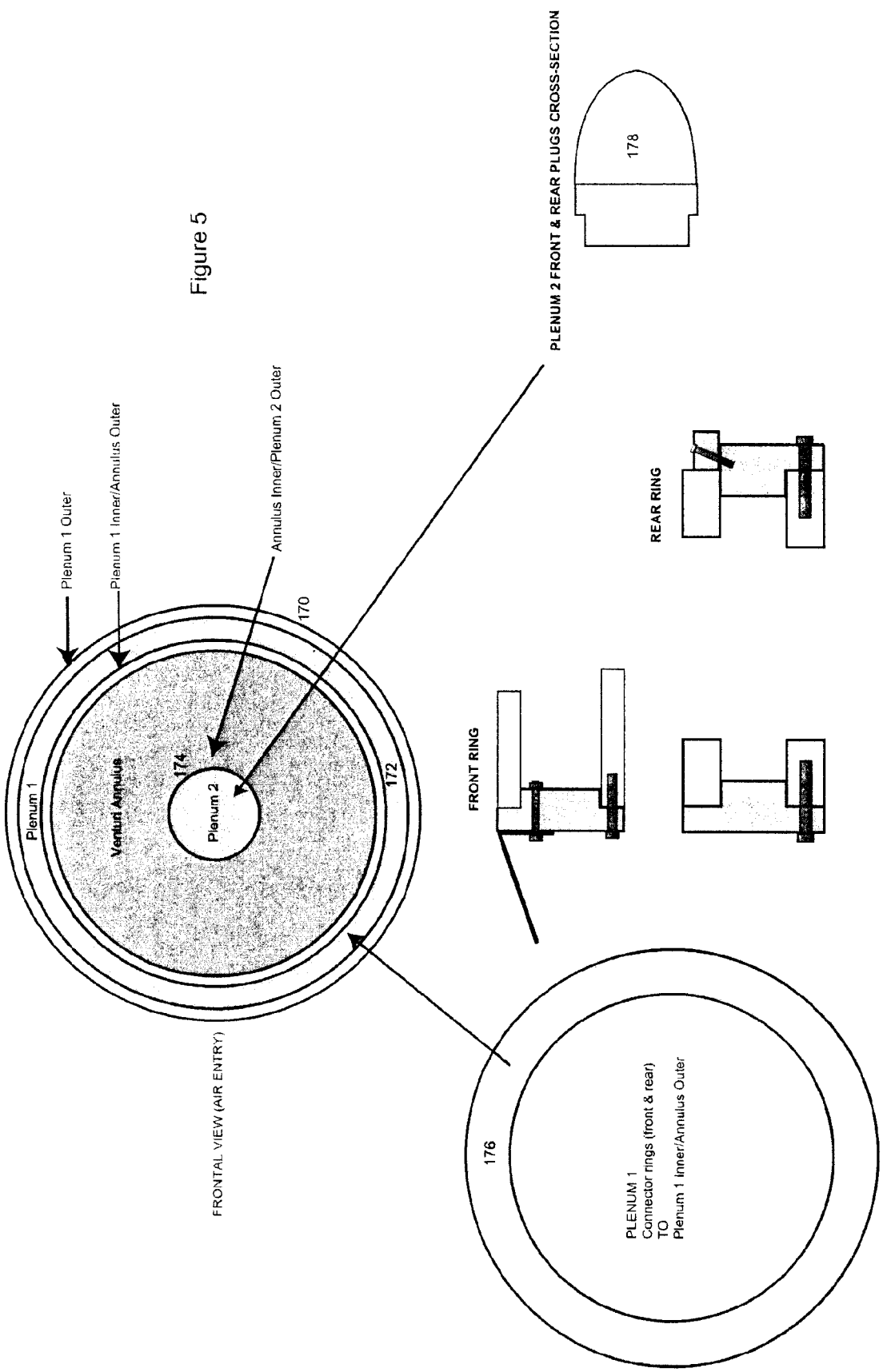
FIG. 5 is a front elevation view of the primary fluid channel throat, isolated front and side elevation views of the structural connector rings of the throat of the primary fluid channel, and a side elevation view of the closure plugs of the inner plenum within the throat of the primary fluid channel of the apparatus shown in FIG. 1.

Referring to FIGS. 4 and 5, the throat 134 is generally constructed from three cylindrical co-axial nested tubes 170, 172, 174, two connector rings 176, two plugs 178, and the inner-outer plenum fluid transfer duct 156. The external boundary of the outer plenum 150 is defined by an unperforated tube 170, and the internal boundary of the outer plenum 150 is defined by a perforated tube 172 and connector rings 176 which connect them. Perforated tube 172 is positioned inside of and separated from unperforated tube 170 by the insertion of structural and end-sealing connector rings 176 in between and at opposing ends of unperforated tube 170 and perforated tube 172. The connector rings 176 may have a flat surface or may have a streamlined aerodynamic shape configured to reduce friction when the primary fluid flow contacts the rings 176. The inner plenum 152 is defined by perforated tube 174 and plugs 178 which are fixed to opposing ends of the perforated tube 174. The perforated tube 174 and plugs 178 are positioned in co-axial alignment with the unperforated tube 170 and perforated tube 172 by the streamlined fluid transfer duct 156 which is fixed to the perforated tube 172 and the perforated tube 174. The fluid transfer duct 156 comprises an airfoil-shaped unperforated tube that is fixed to the perforated tube 172 and the perforated tube 174. Cutouts are made into perforated tube 172 and perforated tube 174 for fluid communication within the fluid transfer duct 156. In addition, a cutout is made in the unperforated tube 170 and sized for fluid communication with the secondary fluid channel 120. All secondary fluid flows through this cutout from secondary fluid channel 120 and ultimately to throat 134.

In the alternative, the throat 134 may comprise multiple additional plenums concentrically arranged between outer plenum 150 and inner plenum 152. This constitutes a "packed" arrangement of nested tubes which in the limit will restrict passage of secondary fluid flow due to channel complexity. Each additional plenum may be constructed from an outer perforated cylindrical tube and an inner perforated cylindrical tube separated by connector rings in a similar manner described above for the construction of the outer plenum 150. Cutouts would be made through each additional plenum in order to permit fluid communication between a series of fluid transfer ducts 156. In the further alternative, the fluid transfer duct(s) 156 may also have perforations 146 through their exterior surfaces thereby acting as additional plenums. In the further alternative, the fluid transfer duct(s) 156 may comprise more advanced airfoil-shaped sections with symmetrical cambers and having their leading and trailing edges in alignment with the longitudinal axis of the throat 134.

The fluid exhaust 136 functions to exhaust the primary and secondary fluids from the throat 134. The fluid exhaust 136 is coupled to and in fluid communication with the throat 134. The fluid exhaust 136 comprises a hollow open-ended frustum (i.e. a truncated cone with its apex cut off by a plane parallel to its base) wherein the truncated end of the cone is coupled to the throat 134. Alternatively, the fluid exhaust 136 may comprise a simple opening or other shapes and geometries that provide a larger cross-sectional area for the primary and secondary fluid flows to exit the fluid exhaust 136 than the cross-sectional area of the throat 134, such as, for example, a simple diffuser or increasing area taper. In the further alternative, the fluid exhaust 136 may be in the form of an extended diffuser, similar in axial length to the primary channel 130.

The augmentor duct 138 functions to create a terminal low pressure region at the exit of the fluid exhaust 136 thereby assisting in drawing the primary and secondary fluids out of the throat 134. The augmentor duct 138 generally comprises a shell that surrounds and is spaced from the exterior surfaces of the fluid intake 132, throat 134 and fluid exhaust 136 by a plurality of structural spacers, defining an open-ended channel therebetween. The interior of the augmentor duct 138 is configured as a gentle taper thereby constricting the flow area of the segregated primary fluid traveling through the duct 138 to a minimum at or near the fluid exhaust 136. This progressive constriction of the augmentor duct 138 reduces the pressure of the segregated primary fluid thereby assisting in drawing primary and secondary fluids out of the fluid exhaust 136. In the present embodiment, the augmentor duct 138 generally comprises two hollow open-ended frustums (i.e. a truncated cone with its apex cut off by a plane parallel to its base) wherein the truncated ends of each frustum are fixed together in fluid communication about the exit of the throat 134, at which point the clearance of augmentor duct 138 from the throat 134 and fluid exhaust 136 is at a minimum. In the alternative, the augmentor duct 138 may comprise other shapes and structures that constrict the flow of the primary fluid at or near the fluid exhaust 136. In the further alternative, the augmentor duct 138 can be excluded entirely from the primary fluid channel 130.

Second Embodiment

Figure 6:
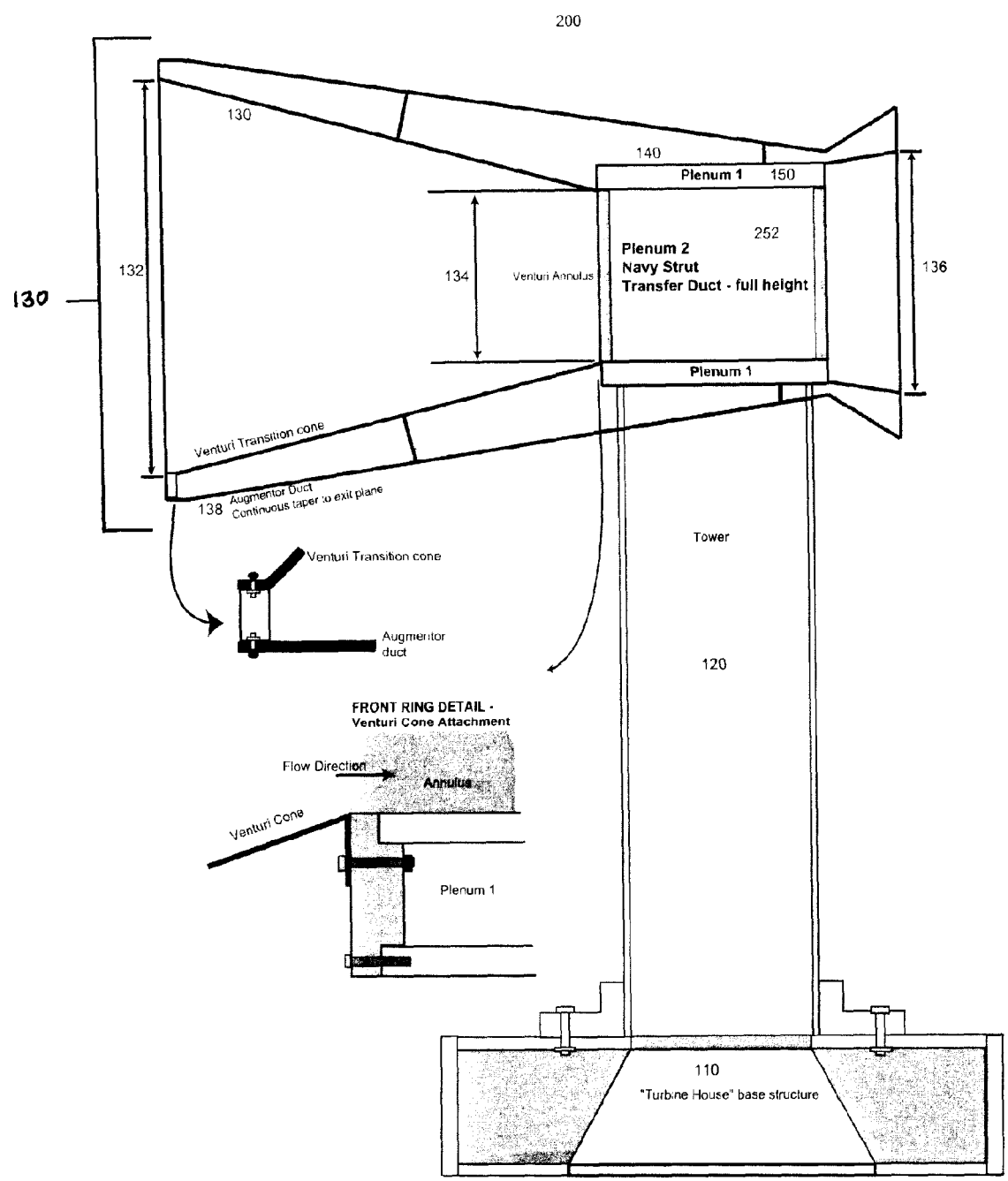
FIG. 6 is a side elevation cross-sectional view of an apparatus for extraction of energy from a fluid flow according to a second embodiment, based on a "vertical wing" arrangement within the core.
Figure 7:
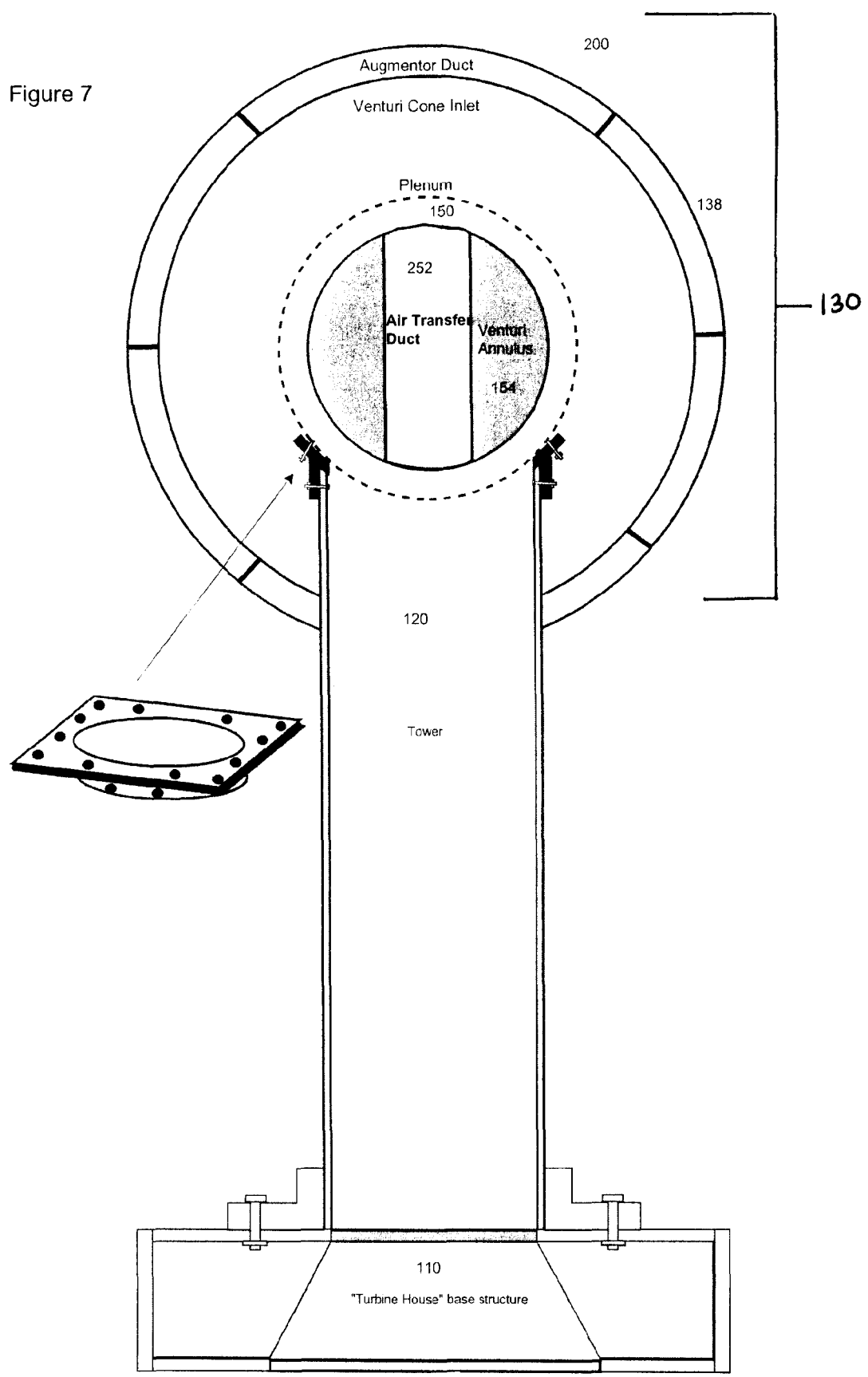
FIG. 7 is a front elevation view of the apparatus shown in FIG. 6.
Figure 8:
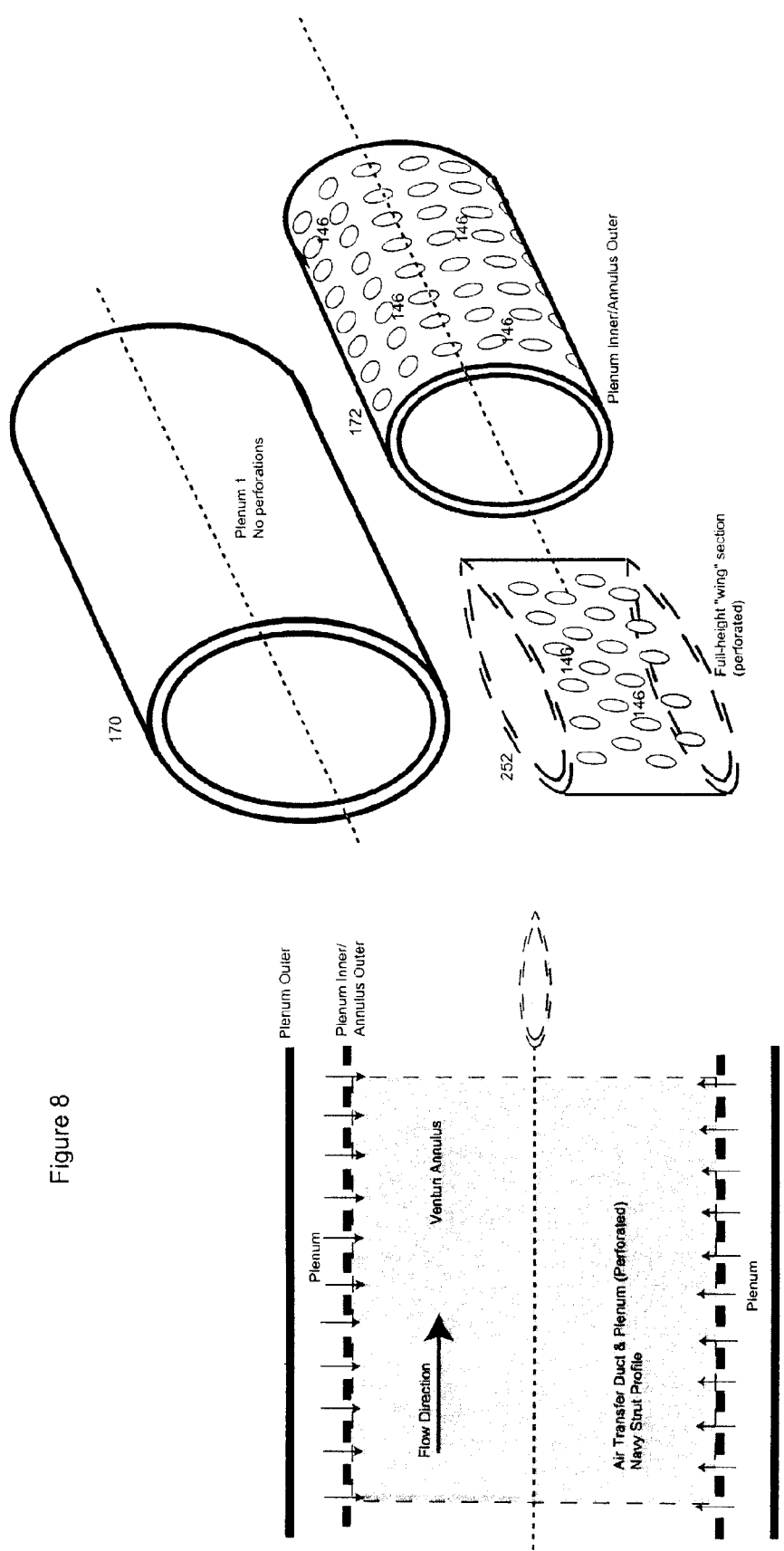
FIG. 8 is an exploded perspective view of the throat of the primary fluid channel of the apparatus shown in FIG. 6 and a side elevation cross-sectional view of the throat.

FIGS. 6 to 8 provide a second embodiment of an apparatus for extraction of energy from a fluid flow generally shown as item 200. The apparatus 200 is identical to the apparatus 100 described above except where identified otherwise. Like numbers are used throughout FIGS. 6 to 8 to identify identical elements in apparatus 200 as described above with respect to apparatus 100.

Referring to FIGS. 6 to 7, the apparatus 200 is conceptually identical to apparatus 100 expect with respect to the interior of the throat 134. In particular, the throat 134 of apparatus 200 does not comprise the inner plenum 152 or the fluid transfer duct 156 of apparatus 100. Instead, the throat 134 comprises an outer plenum 150 and an inner plenum 252. The inner plenum 252 comprises an airfoil-shaped duct with symmetrical cambers and having the leading and trailing edges in alignment with the longitudinal axis of the throat 134. The inner vertical plenum 252 extends between the inner curved surfaces of the outer plenum 150 and is parallel to the longitudinal axis of the secondary fluid channel 120. The inner plenum 252 is fixed to and penetrates the outer plenum 150 at top and bottom so as to be in fluid communication with the outer plenum 150. The inner plenum 252 also comprises a pattern of perforations 146 through its left and right exterior surfaces. In this manner, the inner plenum 252 functions to both receive secondary fluid propagating from the secondary fluid channel 120, as well as to permit the onward propagation of secondary fluid through the perforations 146 from inner plenum 252 to the Venturi annulus 154, or throat 134, and thereafter to continue to the fluid exhaust 136. The inner plenum 252 by virtue of its frontal profile and consequent volumetric occupation of the throat 134, results in further local pressure reduction, and hence enhanced overall suction effect on the secondary fluid from the secondary fluid channel 120. Furthermore, the airfoil profile of plenum 252 generates an additional aerodynamic lift or suction effect within its boundary layer in proximity to the wing surfaces, enhancing suction effect in the throat 134 even further.

Third Embodiment

Figure 9A:
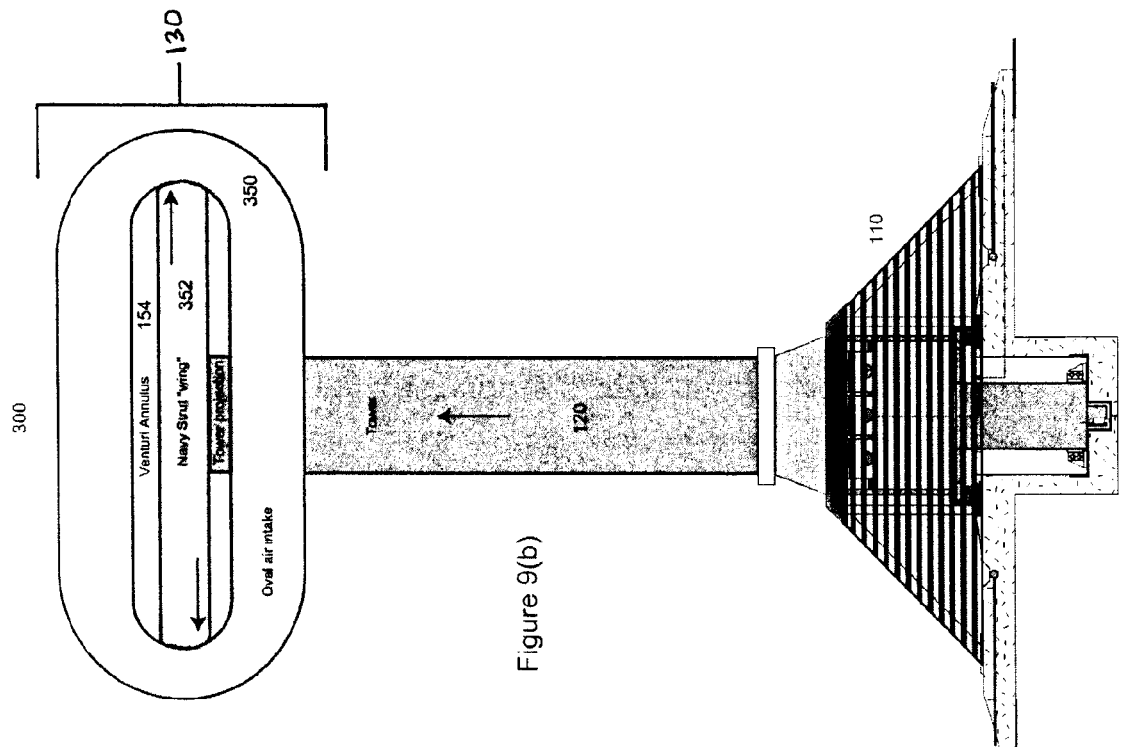
FIG. 9a is a side elevation cross-sectional view of an apparatus for extraction of energy from a fluid flow according to a third embodiment, based on a "horizontal wing" arrangement within the core.
Figure 9B:
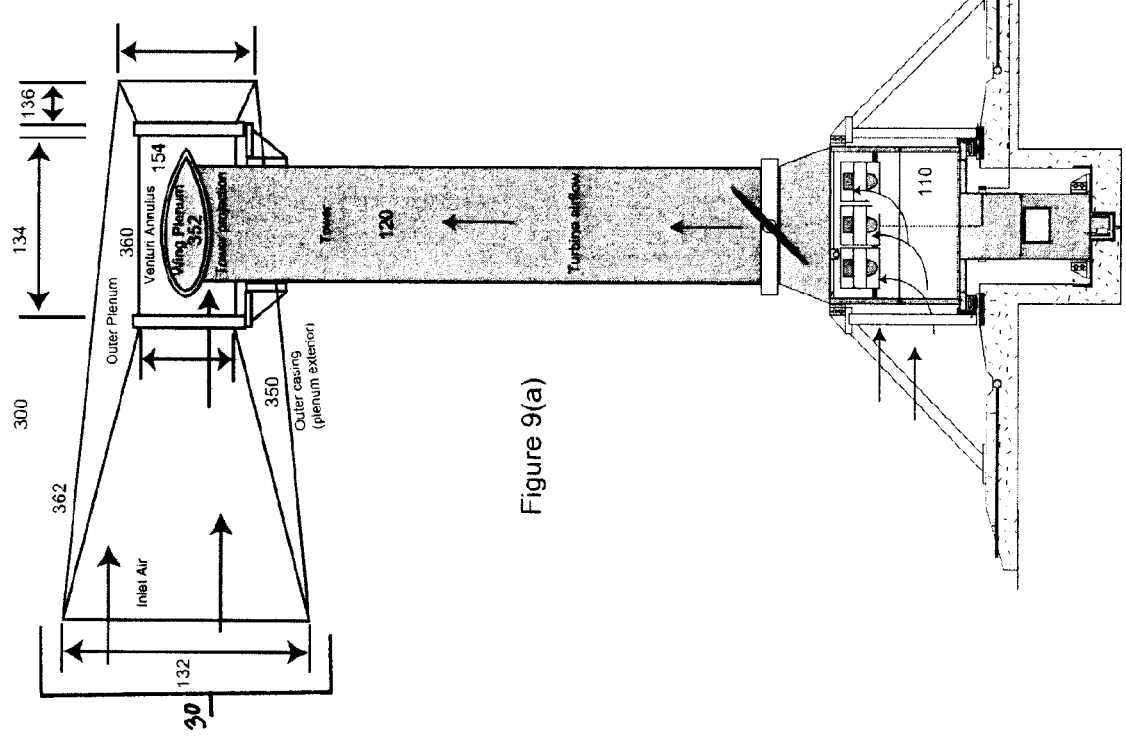

FIGS. 9a and 9b provide a third embodiment of an apparatus for extraction of energy from a fluid flow generally shown as item 300. The apparatus 300 is identical to the apparatus 100 described above except where identified otherwise. Like numbers are used throughout FIGS. 9a and 9b to identify identical elements in apparatus 300 as described above with respect to apparatus 100.

Referring to FIGS. 9a and 9b, the apparatus 300 is conceptually identical to apparatus 100 except with respect to the interior of the throat 134 and in the configuration of the primary fluid channel 130 to house a horizontally integrated wing-shaped plenum 352. In particular, the throat 134 of apparatus 300 does not comprise the inner plenum 152, the outer plenum 150, the fluid transfer duct 156, or the augmentor duct 138 of apparatus 100. The fluid intake 132 and the fluid exhaust 136 of apparatus 300 are functionally identical to those components described above with respect to apparatus 100, except that they are comprised of hollow open-ended oval ductwork structures to suit the internal horizontal wing-shaped plenum 352. An outer plenum 350 comprises an outer surface 362 and inner surface 360 defining an enclosed cavity. The outer surface 362 comprises an oval fabricated shape that extends from the leading edge of the fluid intake 132 to the trailing edge of the fluid exhaust 136. The inner surface 360 generally comprises the outer surfaces of the fluid intake 132, throat 134 and fluid exhaust 136. Cutouts are made at the bottom of the outer plenum 350 through the outer surface 362 and the inner surface 360, to permit the top of the secondary fluid channel 120 to penetrate towards ultimate connection with the wing-shaped plenum 352 and thereby supply secondary fluid flow into the wing-shaped plenum 352 and hence onward to the Venturi annulus channel 154 for mixing the primary and secondary fluid flows. The secondary fluid channel 120 extends through these cutouts and is structurally fixed to the outer bottom surface 362 and the inner surface 360 at the bottom of the outer plenum 350. The portion of the secondary fluid channel 120 between the outer surface 362 and the inner surface 360 of the bottom of the outer plenum 350 extends vertically until it connects structurally with the horizontal wing-shaped plenum 352. The outer plenum 350 is in continuous fluid communication with and around the Venturi annulus channel 154 and in particular with the flat inner surfaces of the outer plenum 350 constituting the throat boundary. This throat boundary has perforations 146 throughout its surfaces to permit a portion of the secondary fluid to propagate from the secondary fluid channel 120, and ultimately join the primary fluid flow in the Venturi annulus channel 154.

The inner plenum 352 comprises an airfoil-shaped duct with symmetrical cambers and having the leading and trailing edges in alignment with the longitudinal axis of the throat 154. The inner plenum 352 is fixed to and penetrates the inner curved surfaces 360 of the outer plenum 350 inner wall such that it is in fluid communication with the outer plenum 350. The secondary fluid channel 120 extends through cutouts in the outer plenum 350 and is fixed to the lower surface of the inner plenum or wing 352. Secondary fluid channel 120 is in direct fluid communication with the interior channel of the inner plenum 352. The inner plenum 352 also comprises perforations 146 through its upper and lower exterior surfaces to permit a portion of the secondary fluid to propagate from the base 110 through the secondary fluid channel 120 to be exhausted into the Venturi annulus channel 154.

The flow path of secondary fluid from the secondary fluid channel 120 is thus: entry to wing-shaped plenum 352, flow left and right inside and along the wing channel, partial discharge through perforations 146 in upper and lower wing surfaces into Venturi annulus channel 154 or throat 134, egress from wing left and right into outer plenum 350, passage therefrom to flat surfaces of throat 134 (top and bottom), discharge through perforations 146 into throat 134, mixing with the primary fluid stream, and ultimate transfer to fluid exhaust 136.

Figure 10:
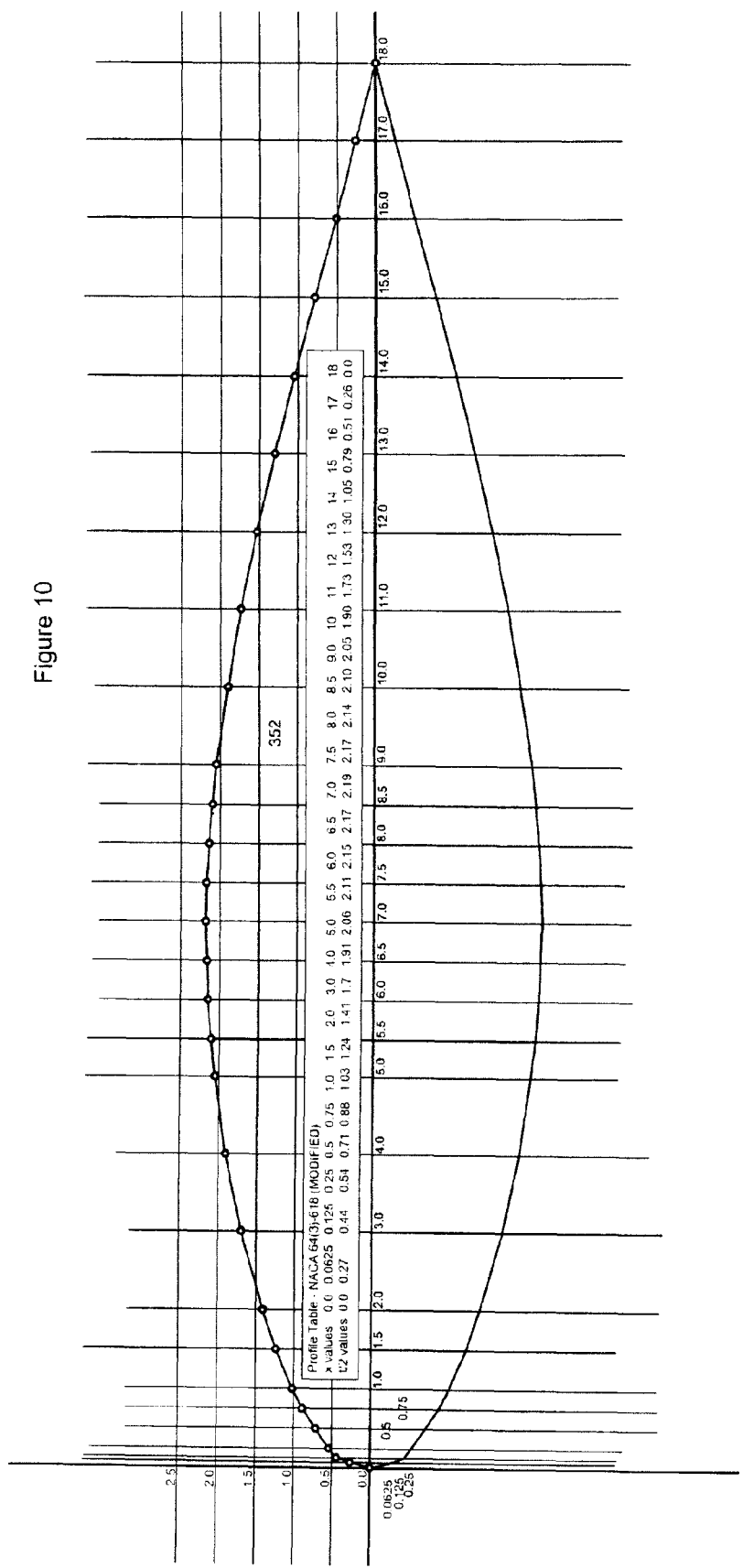
FIG. 10 is a side elevation view of a NACA airfoil section to be used as the "wing" element within the primary fluid channel throat to replace the simple "Navy Strut" airfoil section shown in FIGS. 9a and 9b.

Referring to FIG. 10, the cross-sectional profile of an alternative inner wing-shaped plenum 352 is shown. The profile is a National Advisory Committee for Aeronautics (NACA) 64(3)—618 (modified) profile for the inner plenum 352, which has its location of highest lift (or suction) at 40% of chord as measured from the leading edge, a lift coefficient of 0.6, and a maximum thickness ratio of 18% chord. In the alternative, the cross-sectional profile of the inner plenum 352 may be configured to have the maximum lift (suction) at alternative percentages of chord. In the further alternative, the inner plenum 352 may comprise other shapes and cross-sectional profiles apparent to one skilled in the art, such as, for example, airfoil sections exhibiting favourable characteristics. In the further alternative, the throat 134 may comprise multiple or additional plenums (wings) in fluid communication with the secondary fluid channel 120.

Fourth Embodiment

FIGS. 11a to 11d provide a fourth embodiment of an apparatus for extraction of energy from a fluid flow generally shown as item 400. The apparatus 400 is identical to the apparatus 100 described above except where identified otherwise. Like numbers are used throughout FIGS. 11a to 11d to identify identical elements in apparatus 400 as described above with respect to apparatus 100.

Referring to FIGS. 11a to 11d, the apparatus 400 is conceptually identical to apparatus 100 with the exception of the primary fluid channel 130. The primary fluid channel 130 of apparatus 400 generally comprises an oval tapered fluid intake 432 and a box-like throat section 434. Fluid intake 432 is functionally identical to fluid intake 132 of apparatus 100, except that it is comprised of a hollow open-ended oval cone with its apex cut off by a plane parallel to its base. The truncated portion of the fluid intake 432 is connected to and in fluid communication with the throat 434 in order to direct primary fluid captured by the fluid intake 432 into the throat 434.

Figure 11A:
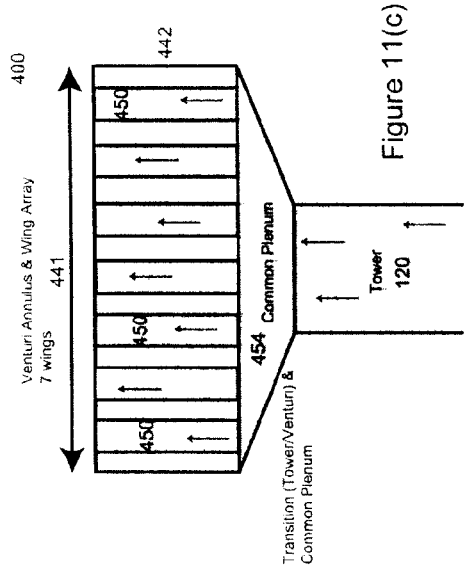
FIG. 11a is a side elevation cross-sectional view of an apparatus for extraction of energy from a fluid flow according to a fourth embodiment, based on a "vertical multiple wing array" arrangement within the core.
Figure 11B:
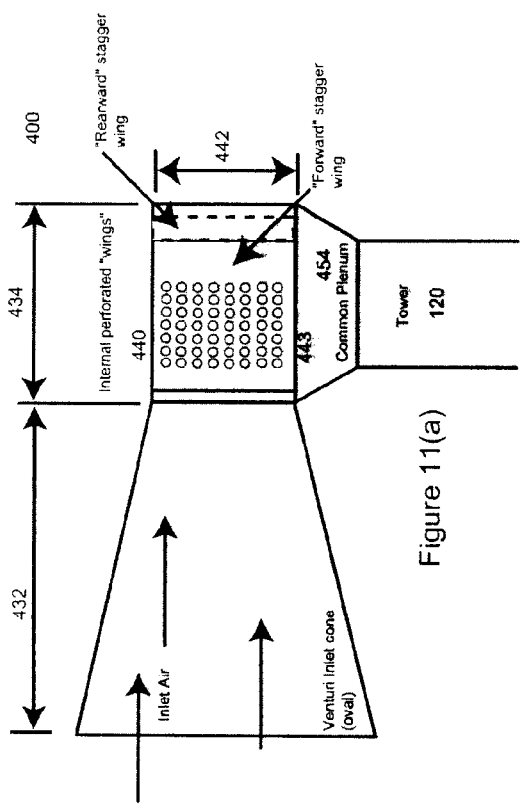
Figure 11C:
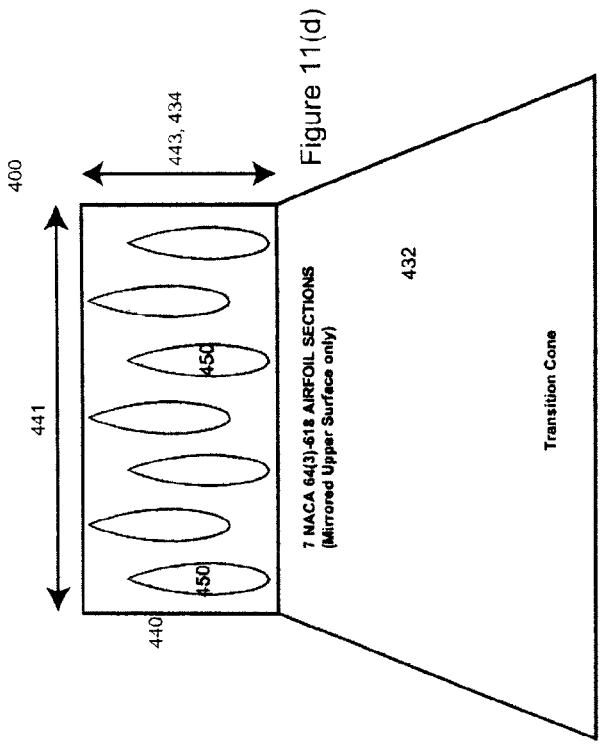
Figure 11D:
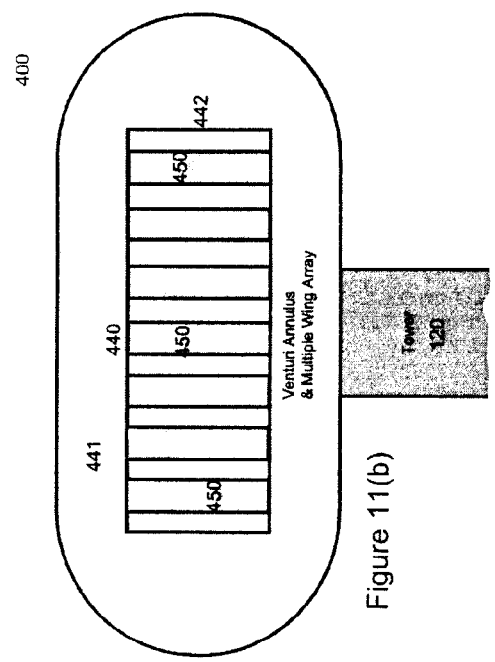

Throat 434 generally comprises a core 440, a plurality of inner plenums 450 distributed within the core 440, and a common plenum 454. Core 440 generally comprises a rectangular open-ended box chamber having a length 443, width 441 and height 442. Each of the plurality of plenums 450 comprises a hollow airfoil-shaped tube with symmetrical cambers and having the leading and trailing edges parallel to the longitudinal axis of the core 440. In the present embodiment, the cross-sectional profile of each plenum 450 is identical to the profile described above in reference to FIG. 10. Alternatively, other profiles may be selected to provide desired suction and thickness characteristics. Each inner plenum 450 extends between the top and bottom surfaces of the core 440 and parallel to the longitudinal axis of the secondary fluid channel 120. The plurality of inner plenums 450 are spaced laterally apart from one another across the width 441 of the core 440 and are staggered longitudinally from neighboring plenums 450 along the length 443 of the core 440 in an alternating manner as shown in FIG. 11d. The staggering of the inner plenums 450 permits denser packing of inner plenums 450 in the core 440 while providing wider flow channels between neighboring plenums 450, thereby reducing local pressure stagnation and frictional interferences, and avoiding the "choking" effect due to over-packing. Each of the inner plenums 450 also comprises patterns of perforations 146 throughout their exterior surfaces to permit secondary fluid to propagate from the secondary fluid channel 120 and the common plenum 454, and to be ultimately exhausted into the interstitial spaces of the throat 434.

The common plenum 454 comprises a hollow body fixed to the bottom of the core 440 and sharing a common surface with the core 440 such that the top side of the common plenum 454 is the bottom side of the core 440. A cutout is made into the bottom of the common plenum 454 and the secondary fluid channel 120 is fixed to the bottom of the common plenum 454 such that the common plenum 454 is in fluid communication with the interior of the secondary fluid channel 120. Airfoil-shaped cutouts are made through the top of the common plenum 454 to align with the inner plenums 450 such that the common plenum 454 is in fluid communication with each of the inner plenums 450. The flow path of secondary fluid from the secondary fluid channel 120 is thus: entry to common plenum 454, transfer to inner plenums 450, discharge through surface perforations 146 to the throat 434, and hence to exhaust from the apparatus 400.

Fifth and Sixth Embodiments

The embodiments described thus far have disclosed apparatuses for the extraction of energy from a fluid flow wherein the primary and secondary fluids were both deemed to be gaseous. It will be apparent to a person skilled in the art that the embodiments described above are equally applicable to the extraction of energy from a fluid flow wherein the primary fluid is a liquid and the secondary fluid is a gas. In addition, water is approximately 800-900 times denser than air, hence potential suction pressures may be correspondingly larger and power production may be higher as compared to air. Accordingly, the scale of the embodiments described above may be reduced for a given power target range if desired.

Figure 12:
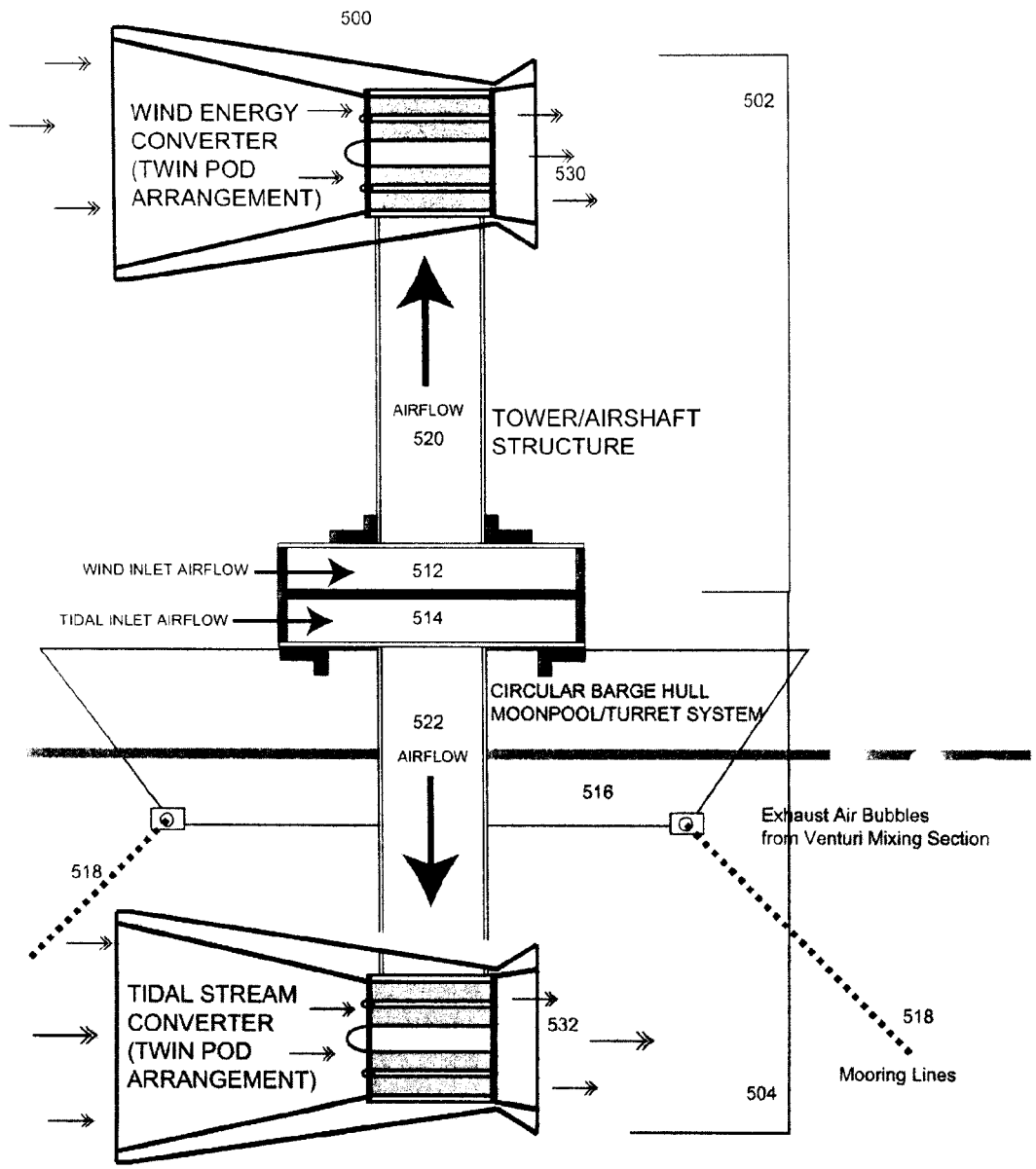
FIG. 12 is a side elevation view of a hybrid (floating) apparatus for extraction of energy from two independent primary fluid flows according to a fifth embodiment, based on the core arrangement of FIG. 1.

Referring to FIG. 12, a hybrid apparatus for the extraction of energy from two independent fluid flows is generally shown as combined item 500. The apparatus 500 generally comprises three major sections: a gas-based apparatus 502 above the waterline, a liquid-based apparatus 504 below the waterline, and a flotation unit 516. The gas-based apparatus 502 comprises a primary gas channel 530 (containing internal features), an upper secondary fluid channel 520, and an upper base 512 which houses an air generator unit. The liquid-based apparatus 504 comprises a lower base 514 which houses an air generator unit, a lower secondary fluid channel 522, and a primary liquid channel 532 (containing internal features). In the alternative, gas-apparatus 502 may be removed from apparatus 500, leaving only apparatus 504 supported by flotation unit 516. In the further alternative, liquid apparatus 504 may be removed from apparatus 500, leaving only apparatus 502 supported by flotation unit 516.

The primary gas channel 530 and the primary liquid channel 532 may comprise any of the primary fluid channel internal throat configurations described above in respect of apparatuses 100, 200, 300 and 400, including airfoil "wing" variants. The primary gas channel 530 utilizes a primary gas fluid flow, such as, for example, air, to create a low pressure region that draws to itself a secondary gaseous fluid flow, such as, for example, air, which by its passage drives a fluid driveable generator unit. The primary liquid channel 532 utilizes a primary liquid fluid flow, such as, for example, water, to create a low pressure region that draws to itself a secondary gaseous fluid flow, such as, for example, air, which by its passage drives a fluid driveable generator unit. In the latter, air bubbles will be formed in the water discharge from the exit of primary liquid channel 532.

The upper secondary fluid channel 520 and the lower secondary fluid channel 522 are identical to secondary fluid channel 120 described above in respect of apparatuses 100, 200, 300 and 400. The upper secondary fluid channel 520 is in fluid communication with the primary gas channel 530 and the upper base 512, and the lower secondary fluid channel 522 is in fluid communication with the primary liquid channel 532 and the lower base 514.

The upper base 512 and lower base 514 are functionally identical to bases 110 described above in respect of apparatuses 100, 200, 300 and 400. The bottom of the base 512 is fixed to the top of the base 514 and thus the partition necessarily segregates the two bases. Each of the bases 512 and 514 house a fluid driveable generator unit (not shown) identical to the fluid driveable generator unit 114 described above in respect of apparatuses 100, 200, 300 and 400. In the alternative, the bases 512, 514 each comprise a separate turbine (not shown) but may share a common generator (not shown) in a manner apparent to one skilled in the art, using a fluid coupling or other mechanical transmission system as appropriate to optimize power output from wind and tide resources.

The flotation unit 516 supports the lower base 514 and upper base 512, and all the required mechanical and electrical power generation equipment, all above the waterline, permitting the bases 512 and 514 to intake the secondary gas flow clear of water ingress and direct salt-spray (in offshore applications) and be more easily accessed and serviced. The flotation unit 516 may comprise a barge, boat, buoy or other device capable of maintaining the upper and lower bases 512, 514 above the waterline and acting as a platform for secondary fluid channels 520 and 522, and their corresponding yaw turntable systems. The flotation unit 516 may be anchored at a desired location in the primary liquid flow regime by the use of mooring lines 518, and anchoring terminations or similar locating devices known in the art.

Figure 13:
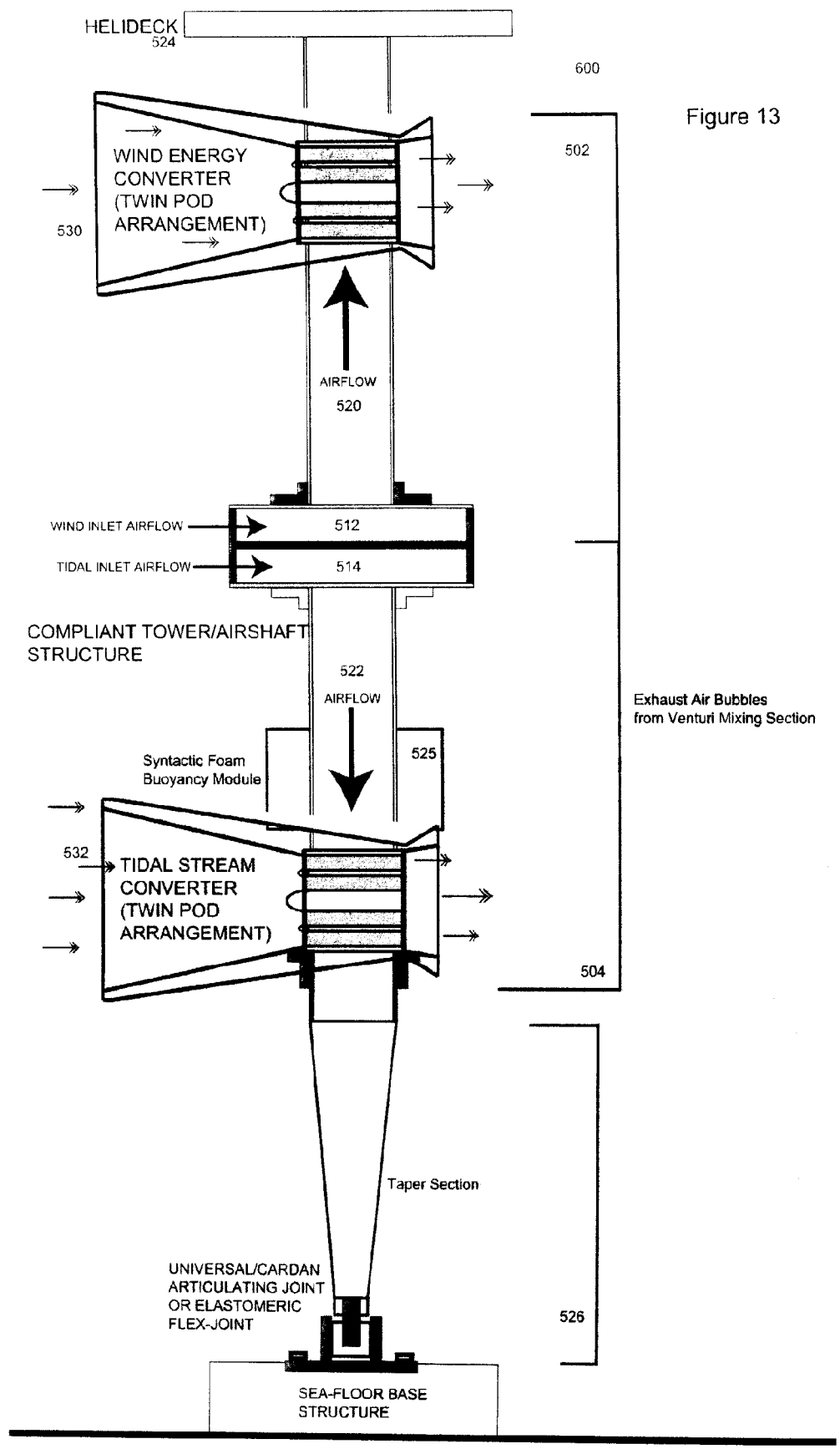
FIG. 13 is a side elevation cross-sectional view of a hybrid (tower/monopile) apparatus for extraction of energy from two independent primary fluid flows according to a sixth embodiment, based on the core arrangement of FIG. 1.

Referring to FIG. 13, an alternative hybrid apparatus for the extraction of energy from two independent fluid flows is generally shown as item 600. The apparatus 600 is functionally identical to the apparatus 500 described above except where identified otherwise. Like numbers are used throughout FIG. 13 to identify identical elements in apparatus 600 with respect to apparatus 500.

The apparatus 600 is functionally identical to apparatus 500 except for: the removal of the flotation unit 516 and its replacement by a structural secondary fluid channel or monopile which is secured to the sea-floor (offshore application) by means of an anchoring module 526, the addition of a required buoyancy module 525, and an optional helideck 524. Helideck 524 comprises a helicopter landing pad fixed to the top of gas-based apparatus 502. Buoyancy module 525 functions to cause the tower/monopile structure to right itself to a vertical orientation when disturbed by tide or wave action in the manner of standard offshore spar-buoys or compliant mooring towers. The upper base 512 and lower base 514, and the mechanical and electrical power generation equipment therein are mounted integrally with the tower structure above the waterline permitting the bases 512, 514 to intake the secondary gas flow clear of water ingress and direct salt-spray (offshore application) and be more easily accessed and serviced. Buoyancy module 525 is fixed to the secondary fluid channel 522 below the waterline and somewhat below the active wave zone and comprises a buoyant material, such as, for example, a syntactic foam. Anchor module 526 functions to anchor the entire apparatus 600 to the floor of a waterway. Anchor module 526 is coupled to the bottom of the liquid-based apparatus 504 and to the base structure on the floor of the waterway in order to permit the apparatus 600 to articulate about a location on the floor of the waterway in a manner know in the art.

Seventh Embodiment

FIGS. 15a to 15d provide a seventh embodiment of an apparatus for extraction of energy from a fluid flow generally shown as item 800. The apparatus functions based upon similar principles as apparatuses 100, 200, 300, 400, 500 and 600. In this embodiment, the primary fluid is a liquid and the secondary fluid is air.

The apparatus 800 generally comprises a primary fluid channel 832 comprising a plurality of wing-shaped plenums 802 laterally spaced from one another in a throat region 834. The primary fluid channel 832 intakes the primary fluid at the fluid intake/exhaust region 832 at one end of the plenums 802 and exhausts the primary fluid at the fluid intake/fluid exhaust region 832 at the other end of the plenum depending on the flow of the primary fluid. In this manner the primary fluid channel is bi-directional, functioning in primary fluid flows of either direction.

Each plenum 832 comprises a plurality of perforations 804 on the exterior surface of the plenum 832. The perforations 804 are in fluid communication with a secondary fluid channel 820 which is in fluid communication with a fluid-driveable generator 806.

The presence of the plenums 802 in the primary flow increases the velocity and decreases the pressure of the primary fluid flow due to reducing flow channel area. The airfoil-sectioned wing shape of the plenums 802 further increases the velocity and reduces the pressure of the primary fluid flowing between the plenums 802. This reduced pressure region in the primary fluid flow draws the secondary fluid though in driving engagement with the fluid-driveable generator 806, through the secondary fluid channel 820, through the perforations 804 an into the primary fluid flow.

Apparatus Performance

While not being bound by theory, it is believed that the overall system performance depends on two critical parameters, namely: (i) the pressure differential ($\Delta P$) which can be maintained by the secondary fluid across the turbine blades of the air turbine, and (ii) the ease by which the secondary fluid (of flowrate magnitude Q) mixes with the primary fluid in the throat system of the subject apparatus. These parameters define the ultimate power extraction equation related to the air turbine: Power=$\Delta P \times Q$.

It is believed that the degree and intensity of suction and the quality of mixing of the secondary fluid flow with the primary fluid flow in the throat section or Venturi annulus of apparatuses 100, 200, 300, 400, 500, 600 and 800 may depend, at least in part, on one or more discrete but related design factors, such as: global geometrical decisions which are dictated by overall size limitations and the need to keep fluid friction losses to a minimum; more specific geometrical decisions which govern the initial velocity ratio hence basic pressure reduction from inlet to the commencement of the throat section; and specific internal configurations within the throat which serve to (i) further reduce cross-sectional area hence lowering local pressure further, (ii) support the means by which the secondary fluid traverses the boundary into the primary fluid stream, such as via perforations in nested ducts or via perforations in airfoil-like plenums, and (iii) create additional localized pressure reductions to add final impetus to secondary air extraction into the throat, as found with airfoil-profiled plenums using higher-lift NACA airfoils with high-suction active boundary layers over much of their chords. These design factors may be optimized using sound and focused engineering practice.

It is also believed that the number, pattern distribution, size and shape of the perforations 146, and the specific placement of such perforations 146 on the surfaces of airfoil-profiled plenums (or wings) which exchange a secondary fluid stream into a primary fluid stream may also constitute a design consideration that affects performance. In one example, wind tunnel testing demonstrated that as the number and size of perforations 146 increases, the combined cross-sectional area at the interface for secondary fluid flow increases. However, as the cross-sectional area became too large, the ability of airfoil-profiled plenums to reduce the local pressure of the primary fluid flow using aerodynamic suction effect was impaired. Conversely, as the combined cross-sectional area of perforations became too small, the velocity of the secondary fluid passing through the perforations 146 increased to a level where the amount of friction generated impaired the ability of the secondary fluid to leave the plenums and thereby mix with the primary fluid flow (the system effectively "chokes"). In this example, it was found that a range of perforation cross-sectional area between 50% and 100% of the secondary fluid channel internal cross-sectional flow area provides acceptable system performance. It was also found that improved system performance may be achieved by accepting higher friction through the short-conduit perforations and having less of them (especially for airfoil-profiled plenums where aerodynamic suction effect might suffer otherwise).

In this example, it was also found that the shape of the perforations 146 affect performance of the system somewhat. Geometries (both 2D & 3D) that reduce friction in the passage of secondary to primary fluid flows generally increased the suction and quality of mixing about the perforations 146. It was found that a simple slot perforation, in a basic staggered pattern provided good performance for airfoil-profiled plenums. It is believed that alternative slot shapes that preserve the aerodynamic suction effect in the boundary layer while allowing enough perforation area to avoid excessive friction losses, may also provide performance benefits.

Figure 14B:
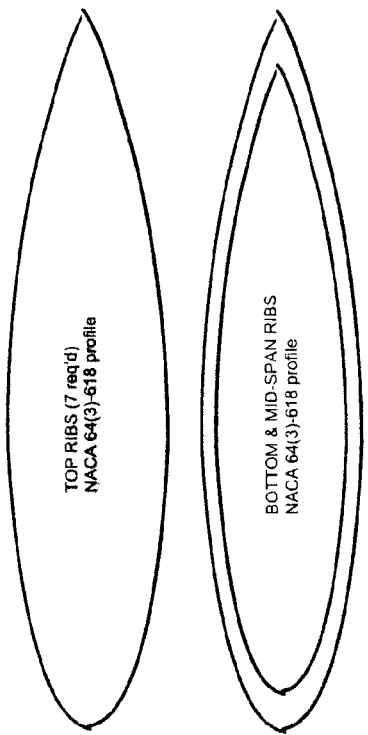
FIG. 14b is a front elevation cross-sectional view of the wing skin shown in FIG. 14a having an array of perforations.
Figure 14B:
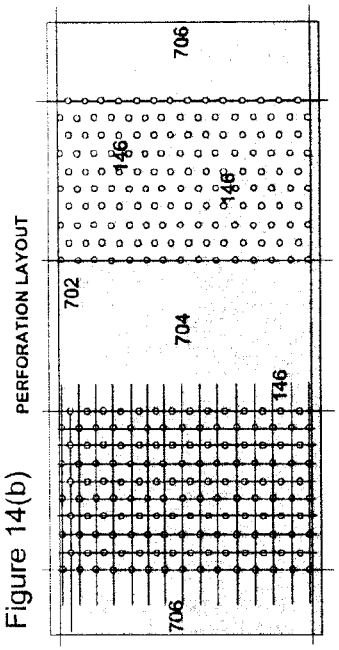
Figure 14A:
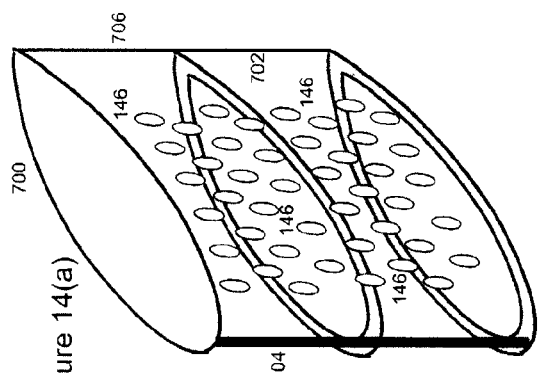
FIG. 14a is a front perspective cross-sectional view of a perforated wing section whose skin acts as an interface (secondary-to-primary fluid boundary) according to an embodiment.

In this example, it was also found that the specific placement of the perforations 146 on airfoil-profiled plenums affected performance. It was found that perforations 146 located in regions of the plenums where the local pressure of the primary fluid flow is lower, provided improved mixing of primary and secondary fluid flows as compared to perforations 146 located in regions where the pressure of the primary fluid flow is higher. Airfoil-profiled cross-sections produce lower pressure regions closer to the leading edge as compared to the trailing edge. Accordingly, perforations located closer to the leading edge of such plenums experienced higher suction compared to perforations located closer to the trailing edge. However, it was also found that placing too many perforations in close proximity to the leading edge may significantly lower and dilute the low pressure generated aerodynamically at the leading edge. It was found that a compromise was to move perforations further back, maintaining the generated pressure profile over more of the chord. Setting perforations near the trailing edge was much less effective since there was little or no aerodynamic suction at the trailing edge. It is believed that there may in fact be elevated pressures due to breakaway of the boundary layer and a partial stall condition. It was found that one appropriate compromise for perforation pattern placement is a band approximately 25% to 55% of chord measured from the leading edge of a typical airfoil plenum. For example, referring to FIGS. 14a and 14b, a plenum 700 is shown comprising an airfoil-profiled duct with symmetrical cambers. Perforations 146 are located on the left and right surfaces 702 of the plenum 700 extending from around 25% to 55% of chord from the leading edge of the plenum 700.

While particular embodiments of the present invention have been described in the foregoing, it is to be understood that other embodiments are possible within the scope of the invention and are intended to be included therein. It will be clear to any person skilled in the art that modifications of and adjustments to this invention, not shown at this writing, are possible without departing from the spirit of the invention as demonstrated through the exemplary embodiment. For example, while the foregoing embodiments have described air as the second fluid flow, it is to be understood that other gases and liquids may be utilized as the second fluid flow. For example, one design may incorporate multiple airfoil plenum devices which act as the final secondary fluid transfer medium to the primary fluid simply because airfoil sections provide a third stage of pressure reduction at the very interface where mixing is to occur. To re-iterate, the three stages of pressure reduction in the subject apparatuses are caused by: (i) initial velocity ratio effect inlet-to-throat (ii) reduced throat area by airfoil devices occupying volume in the throat, hence increasing local velocities further (iii) localized aerodynamic boundary layer effect supplying a final impetus to promote efficient secondary fluid withdrawal and mixing. Even at this writing, it is thought likely that the secondary fluid channel diameter could be reduced since the friction penalty is considered small compared to aesthetic and cost benefits. Furthermore, throughout the variant apparatuses, design improvements in the form of smoother transitions, possibly bellmouth entry ducting, and similar flow-promoting friction-reducing improvements are assumed worthy of implementation. Similarly, skin friction and parasite drag on perforated plenums would be addressed, to avoid adverse velocity slow-down of the primary fluid passage (which directly influences pressure reduction). Application-related refinements might be placement of the apparatus on the crest of a hill, requiring only a base and topworks (ductwork/throat/plenums)—but no tower support structure; or integration of the apparatus in the roof structure of a high-rise building.

The invention claimed is:

1. An apparatus for extracting energy from a fluid flow, comprising:
 (a) a primary fluid channel comprising:
   (i) a fluid intake configured to intake a primary fluid; and
   (ii) a throat in fluid communication with the fluid intake, the throat configured to increase the flow velocity and reduce the pressure of the primary fluid flowing through the primary fluid channel, the throat comprising at least one plenum in the interior of the throat configured to further reduce the pressure of the primary fluid flowing through the primary fluid channel, the plenum comprising at least one perforation through its exterior surface in fluid communication with a vertically oriented elongate secondary fluid channel;
 (b) the vertically oriented elongate secondary fluid channel in fluid communication with the primary fluid channel, said vertically oriented elongate secondary fluid channel having a first end and a second end wherein the first end is configured to intake a secondary fluid;
 (c) a fluid driveable generator unit in fluid communication with the second end of the vertically oriented elongate secondary fluid channel; and
 wherein the flow of primary fluid through the primary fluid channel draws the secondary fluid into the primary fluid channel through the vertically oriented elongate secondary fluid channel and the perforation and thereby into driving engagement with the generator,
 wherein a shape of the at least one plenum comprises a closed wing shape, and where the perforations are located on and span the exterior surface of the at least one plenum between 25% to 55% of chord measured from the leading edge of the plenum.

2. The apparatus as claimed in claim 1, wherein the at least one plenum comprises an inner plenum and an outer plenum, the inner plenum having a closed wing shape, and the outer plenum having a closed tubular shape concentric with the inner plenum.

3. The apparatus as claimed in claim 2, wherein the outer plenum comprises a plurality of concentrically nested outer plenums spaced radially apart from one another and concentric with the inner plenum.

4. The apparatus as claimed in claim 1, wherein the at least one plenum comprises a plurality of concentrically nested plenums having a closed wing shape.

5. The apparatus as claimed in claim 1, wherein a shape of the at least one plenum comprises a planar wing shape.

6. The apparatus as claimed in claim 5, wherein the at least one plenum comprises a plurality of plenums having a planar wing shape.

7. The apparatus as claimed in claim 6, wherein the plurality of plenums are spaced laterally apart from one another and staggered longitudinally from immediately neighboring plenums.

8. The apparatus as claimed in claim 1, wherein the cross-section of the at least one plenum comprises an airfoil shape with symmetrical cambers.

9. The apparatus as claimed in claim 8, wherein the cross-section of the at least one plenum comprises an NACA airfoil shape with symmetrical cambers.

10. The apparatus as claimed in claim 1, wherein the total cross-sectional area of the at least one perforation is between 50% to 100% of the internal cross-sectional area of the secondary fluid channel.

11. The apparatus as claimed in claim 1, wherein a higher number of perforations are located on exterior surface regions of at least one plenum where the primary fluid exhibits a lower operational pressure as compared to the number of perforations located on exterior surface regions of the plenum where the primary fluid exhibits a higher operational pressure.

12. The apparatus as claimed in claim 1, wherein at least one perforation comprises a slot shape.

13. The apparatus as claimed in claim 1, wherein the primary fluid channel further comprises a fluid exhaust configured to exhaust the primary fluid and secondary fluid from the primary fluid channel.

14. The apparatus as claimed in claim 1, wherein the primary fluid channel further comprises an augmentor channel configured to create a low pressure region at the exit of the primary fluid channel.

15. The apparatus as claimed in claim 1, further comprising a base comprising a fluid intake configured to intake the secondary fluid and in fluid communication with the secondary fluid channel.

16. The apparatus as claimed in claim 1, wherein the primary fluid is a gas and the secondary fluid is a gas.

17. The apparatus as claimed in claim 1, wherein the primary fluid is a liquid and the secondary fluid is a gas.

18. The apparatus as claimed in claim 1, wherein the primary fluid is a liquid and the secondary fluid is a liquid.

19. An apparatus for extracting energy from two independent fluid flows, comprising:

(b) a gas-based apparatus in accordance with claim 1, wherein the primary fluid flow is a gas and the secondary fluid flow is a gas;

(c) a liquid-based apparatus in accordance with claim 1, wherein the primary fluid flow is a liquid and the secondary fluid flow is a gas; and (d) a common base comprising a first fluid intake and a second fluid intake, the first fluid intake configured to intake the secondary fluid for the gas-based apparatus, the first fluid intake in fluid communication with the secondary fluid channel of the gas-based apparatus, the second fluid intake configured to intake the secondary fluid for the liquid-based apparatus, the second fluid intake in fluid communication with the secondary fluid channel of the liquid-based apparatus.

* * * * *